United States Patent
Chaki et al.

(10) Patent No.: US 10,362,452 B2
(45) Date of Patent: Jul. 23, 2019

(54) MECHANISM FOR QUICK CONNECTION IN WIRELESS PEER TO PEER NETWORKS

(71) Applicant: NEC Corporation, Tokyo (JP)

(72) Inventors: Prakash Chaki, Tokyo (JP); Masato Yasuda, Tokyo (JP); Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 33 days.

(21) Appl. No.: 15/528,027

(22) PCT Filed: Nov. 26, 2014

(86) PCT No.: PCT/JP2014/005928
§ 371 (c)(1),
(2) Date: May 18, 2017

(87) PCT Pub. No.: WO2016/084114
PCT Pub. Date: Jun. 2, 2016

(65) Prior Publication Data
US 2018/0343547 A1    Nov. 29, 2018

(51) Int. Cl.
*H04W 4/08* (2009.01)
*H04W 8/00* (2009.01)
(Continued)

(52) U.S. Cl.
CPC .......... *H04W 4/08* (2013.01); *H04L 67/1051* (2013.01); *H04L 67/1068* (2013.01);
(Continued)

(58) Field of Classification Search
None
See application file for complete search history.

(56) References Cited

U.S. PATENT DOCUMENTS

| | | | |
|---|---|---|---|
| 6,975,613 B1* | 12/2005 | Johansson | H04W 72/12 370/331 |
| 2003/0158936 A1* | 8/2003 | Knop | H04L 29/06 709/224 |

(Continued)

FOREIGN PATENT DOCUMENTS

| | | |
|---|---|---|
| EP | 1 548 985 A1 | 6/2005 |
| EP | 2 519 071 A2 | 10/2012 |

(Continued)

OTHER PUBLICATIONS

International Search Report corresponding to PCT/JP2014/005928, dated Jan. 6, 2015 (3 pages).

(Continued)

*Primary Examiner* — Michael J Moore, Jr.
(74) *Attorney, Agent, or Firm* — Wilmer Cutler Pickering Hale and Dorr LLP

(57) ABSTRACT

A connection method in a wireless peer-to-peer group of nodes, wherein one of the nodes acts as a leader and others act as clients of the group, includes the steps of: sending credential information required for creating a virtual persistent group configuration from the leader to each of the clients; creating a virtual persistent group configuration at each of the clients which has received the credential information from the leader; and when leadership of the leader disappears, establishing a first-time connection between a first client and a second client based on persistent mechanism by invitation using the virtual persistent group configuration.

26 Claims, 26 Drawing Sheets

(51) Int. Cl.
*H04W 76/14* (2018.01)
*H04L 29/08* (2006.01)
*H04W 12/00* (2009.01)
*H04W 84/20* (2009.01)

(52) U.S. Cl.
CPC ......... *H04W 8/005* (2013.01); *H04W 12/003* (2019.01); *H04W 76/14* (2018.02); *H04W 84/20* (2013.01)

(56) References Cited

U.S. PATENT DOCUMENTS

| | | | |
|---|---|---|---|
| 2005/0086273 A1 | 4/2005 | Loebbert et al. | |
| 2007/0121667 A1* | 5/2007 | Hare | H04L 45/02 370/462 |
| 2010/0271959 A1* | 10/2010 | Qi | H04L 41/12 370/248 |
| 2011/0235561 A1* | 9/2011 | Liu | H04L 41/30 370/311 |
| 2012/0173620 A1* | 7/2012 | Holostov | H04L 67/1048 709/204 |
| 2012/0278389 A1 | 11/2012 | Thangadorai | |
| 2012/0317199 A1* | 12/2012 | Nam | H04L 67/1044 709/204 |
| 2013/0039358 A1 | 2/2013 | Ejima | |
| 2013/0242805 A1 | 9/2013 | Jung | |
| 2013/0278412 A1* | 10/2013 | Kelly | G08B 26/00 340/539.1 |
| 2014/0003286 A1 | 1/2014 | Estevez et al. | |
| 2014/0201280 A1 | 7/2014 | Qi et al. | |
| 2015/0264123 A1* | 9/2015 | Smadi | H04W 4/12 709/206 |
| 2017/0078382 A1* | 3/2017 | Prakash | H04W 8/186 |

FOREIGN PATENT DOCUMENTS

| | | |
|---|---|---|
| JP | 2004-129042 A | 4/2004 |
| JP | 2013-038724 A | 2/2013 |
| WO | WO-2013/162496 A1 | 10/2013 |

OTHER PUBLICATIONS

Written Opinion corresponding to PCT/JP2014/005928, dated Jan. 6, 2015 (3 pages).

Japanese Office Action issued by the Japan Patent Office for Japanese Application No. 2017-526985 dated May 9, 2018 (7 pages).

* cited by examiner

FIG. 4

EGO LIST 203

| NODE ID | PRESHARED KEY | SSID | BSSID |
|---|---|---|---|
| ID1 (NODE102) | PSK1 | SSID1 | BSSID1 |
| ID2 (NODE103) | PSK2 | SSID2 | BSSID2 |
| ....... | ....... | ....... | ....... |

PREDETERMINED NUMBER k OF ENTRIES
(IN DECREASING ORDER OF PRIORITY) →

PERSISTENT GROUP FORMATION

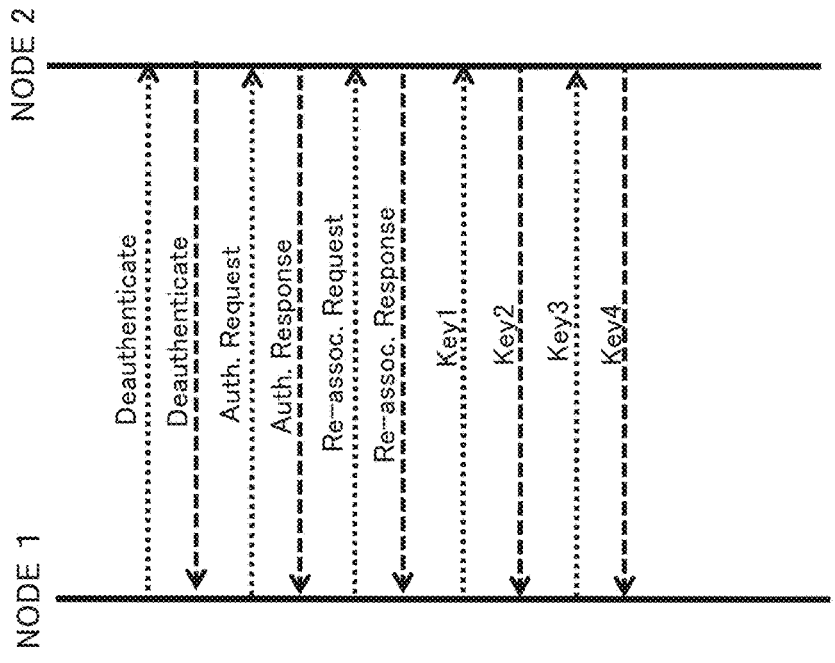

MECHANISM FOR QUICK CONNECTION IN WIRELESS PEER TO PEER NETWORKS

CROSS-REFERENCE TO RELATED APPLICATIONS

This application is a national stage application of International Application No. PCT/JP2014/005928 entitled "MECHANISM FOR QUICK CONNECTION IN WIRELESS PEER TO PEER NETWORKS," filed on Nov. 26, 2014, the disclosure of which is hereby incorporated by reference in its entirety.

TECHNICAL FIELD

The present invention relates to wireless communication systems, and more particularly to group reformation method and system in wireless peer-to-peer (P2P) networks.

BACKGROUND ART

Traditional Wi-Fi Infrastructure mode WLAN includes a centralized Access Point (AP) to which multiple stations (STA) associate. STAs communicate with each other through the AP which is connected to a wired backbone network. The recently released industrial standard, Wi-Fi Peer to Peer (P2P), also known by the commercial name Wi-Fi Direct, allows devices to connect to each other directly without requiring any AP or Internet connectivity. As a basic feature of Wi-Fi Direct standard, the AP functionality is implemented in software which obviates the need of a specialized hardware to play the role of AP; thus allowing any device compatible with the standard to have the capability of acting as AP. Devices intending to communicate with each other participate in a comprehensive process of Group Formation, by which one of the devices assumes the role of Group Owner (GO) (analogous to AP) and the other acts as client (analogous to STA). Wi-Fi Direct standard deviates from Wi-Fi Infrastructure mode by doing away with the need for Internet or a router, and from Wi-Fi ad-hoc (IBSS) by increasing security and maximum supportable data rate. The standard does not allow transfer of Group Ownership in case a Group Owner wants to leave the group. This results in a disruption in group activity when the Group Owner leaves or quits from its leadership role.

In peer-to-peer networks like Wi-Fi Direct where the GO can be a human-intervened device like laptop computer or smart phones, the case of Selfish GO can be quite a common scenario who does not wish to spend its resources (power, processor etc.) for serving others after it is done with its service from the P2P group. At the same time, it will also be unfair on the part of the GO if it is asked to continue its service of group management even though it is no longer in need of any service from the group and requires an urgent service that is not available in the current group and needs it to join another group. Devices join a peer-to-peer group when they need each other's service; if any client device is allowed to leave a group freely once its service requirement is met, then the same rule should hold for the GO as well. Since the original motivation behind Wi-Fi Direct is to generalize the role of the AP by enabling any device to act as GO, the next step should be to further generalize it in the way that the GO should also be allowed to leave the group anytime like any other node in the group; or at least transfer its leadership role to other peers in the same group for load balancing.

There are a couple of publications in the related art to propose an exit scheme for the leaving GO without disrupting the current group. But these publications focus on cases where the GO opts to quit and chooses its successor and systematically hands over the GO-ship before leaving. For example, PTL 1 (US 2012/0278389 A1) discloses a scheme where the leaving GO asks for GO intent from multiple clients before it decides to quit and selects the most suitable node out of all the nodes who reply with an intent to become the next GO. The information about the new GO is then shared by the leaving GO before it leaves. PTL 2 (WO2013162496 A1) discloses a scheme where the leaving GO asks for intent of successor ship from the group members and prepares a list of successor GOs, which may be prioritized based on credentials and shares the list with the group members before leaving. Also, none of the two disclosed publications specify any mechanism for fast topology reformation when leadership is handed over from the leader to the successor.

CITATION LIST

Patent Literature

[PTL 1]
US 2012/0278389 A1
[PTL 2]
WO2013162496 A1

SUMMARY

Technical Problem

The scheme proposed by PTL 1 implicitly makes the assumption that the leaving GO has sufficient time to choose the successor before it leaves, thus it fails in the scenario where the GO suddenly disappears due to a sudden event like, disaster, abrupt power failure, mobility, random behavior of wireless channel or selfish GO case as discussed above. The scheme proposed by PTL 2 is also flawed with the same issue as it fails to address the problem created by sudden disappearance of GO. Also, although it proposes to share a list of multiple successor nodes before leaving, it does not justify the reason or benefit of doing that as all nodes connect to the 1st node in the list. So, there is no advantage associated to preparing and sharing a list of multiple successor nodes. Thus, in essence, it degenerates to the first idea itself.

In transfer of Group Ownership from the GO device to another client device of the same group who is capable of managing the group, clients have to start the Wi-Fi P2P group formation mechanism with the successor from scratch when the original GO device quits. This creates significant interruption in the ongoing group activity. Although Persistent Group Formation by means of P2P Invitation mechanism is the fastest group formation procedure specified by the Wi-Fi P2P standard, such mechanism fails in this scenario as the procedure requires a past history of GO-Client relationship between two nodes. However, since the successor and the clients never shared a GO-Client relationship, it is not possible for the Client devices to connect quickly to the successor once the GO quits.

It is an object of this invention to restore quick inter-connectivity in peer-to-peer networks when its network leader leaves unexpectedly.

In addition to the objects mentioned, other obvious and apparent advantages of the invention will be reflected from the detailed specification and drawings.

Solution to Problem

According to an aspect of the present invention, a connection method in a wireless peer-to-peer group of nodes, wherein one of the nodes acts as a leader and others act as clients of the group, includes the steps of: leader node sending credential information and information of successor node(s) to other client(s) and vice-versa, required for creating a virtual persistent group configuration between the successor node(s) and the client(s) creating a virtual persistent group configuration at each of the clients which has received the credential information from the leader; and when the leader disappears, establishing a first-time connection between a successor and other clients based on persistent mechanism by invitation using the virtual persistent group configuration. According to another aspect of the present invention, a system for forming a wireless peer-to-peer group of nodes, wherein one of the nodes acts as a leader and others act as clients of the group, wherein the leader sends credential information required for creating a virtual persistent group configuration to each of the clients; each of the clients which has received the credential information from the leader creates an artificial history of persistent group session with the successor node; the successor node(s) also creating an artificial history of persistent group session with all the devices associated to the incumbent group; and the client(s) establish a first-time connection with the successor node based on persistent mechanism by invitation using the virtual persistent group configuration when the leader disappears.

According to another aspect of the present invention, a connection method in a wireless peer-to-peer group of nodes, wherein one of the nodes acts as a leader and others act as clients of the group, wherein an incumbent leader provides each of the clients with an emergency leader list and credential information, wherein the emergency leader list includes a plurality of prioritized emergency leaders and the credential information includes credentials for creation of persistent group configurations with the emergency leaders, wherein the emergency leaders are clients of an incumbent group; each of the clients creates a virtual persistent group configuration in presence of the incumbent leader based on the emergency leader list and the credential information, wherein the virtual persistent group configuration depends on whether the client is a persistent client or an emergency leader; invitation is exchanged between the emergency leader and each of the persistent clients when the incumbent leader quits; and each of the persistent clients invokes a persistent group with the emergency leader as a new persistent leader using the virtual persistent group configuration.

Advantageous Effects of Invention

According to the present invention, inter-connectivity can be quickly restored in peer-to-peer networks when its network leader leaves unexpectedly or transfers leadership to another peer of its group for load-balancing of the leader node or any other application that requires dynamic switching of leadership among the nodes of a Wi-Fi P2P group. The invention will also serve helpful in group reformation among a plurality of Wi-Fi Direct groups for sharing content outside the group.

The present invention allows quick reconnection among nodes in a Wi-Fi P2P group who do not share a prior GO-Client relationship, by invitation mechanism; thus the invention facilitates group formation using a persistent mechanism by invitation, that is neither common nor possible in a scenario following the specifications of the Wi-Fi P2P standard.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF DRAWINGS

FIG. 4 is a schematic diagram showing an example of an EGO list provided in a node according to an exemplary embodiment of the present invention.

FIG. 9 is a flowchart showing a third example of invocation of persistent group when the GO node leaves according to the exemplary embodiment of present invention.

FIG. 26 is a schematic diagram showing an operation of Wi-Fi Direct WPS Provisioning (Phase 2).

DETAILED DESCRIPTION

1. Outline of Exemplary Embodiments

According to an exemplary embodiment of the present invention, quick group reformation is achieved in a wireless peer-to-peer group of nodes by using persistent group formation mechanism between nodes having no prior history of leader-client relationship. More specifically, all clients creates a virtual persistent group configuration in presence of an incumbent leader, in which at least one emergency leader is designated as their persistent leader and the other nodes as its persistent client using emergency leader information and credentials shared by the incumbent leader. When the original leader quits, the invitation process is started between the emergency leader and all the clients to invoke a persistent group with the emergency leader as their new leader. Hereinafter, an incumbent leader is referred to as Group Owner (GO) and an emergency leader as Emergency Group Owner (EGO).

1.1) Ego-Based Mechanism

Exemplary embodiments of the present invention will be described on the basis of an EGO-based mechanism which can solve a problem of sudden disruption caused by an unexpected exit of the GO node. The EGO-based mechanism was already proposed in an international application (PCT/JP2014/001160) filed by the present applicant on Mar. 3, 2014. A simplified example of the EGO-based mechanism will be briefly described by reference to FIG. 1.

Figure 1:
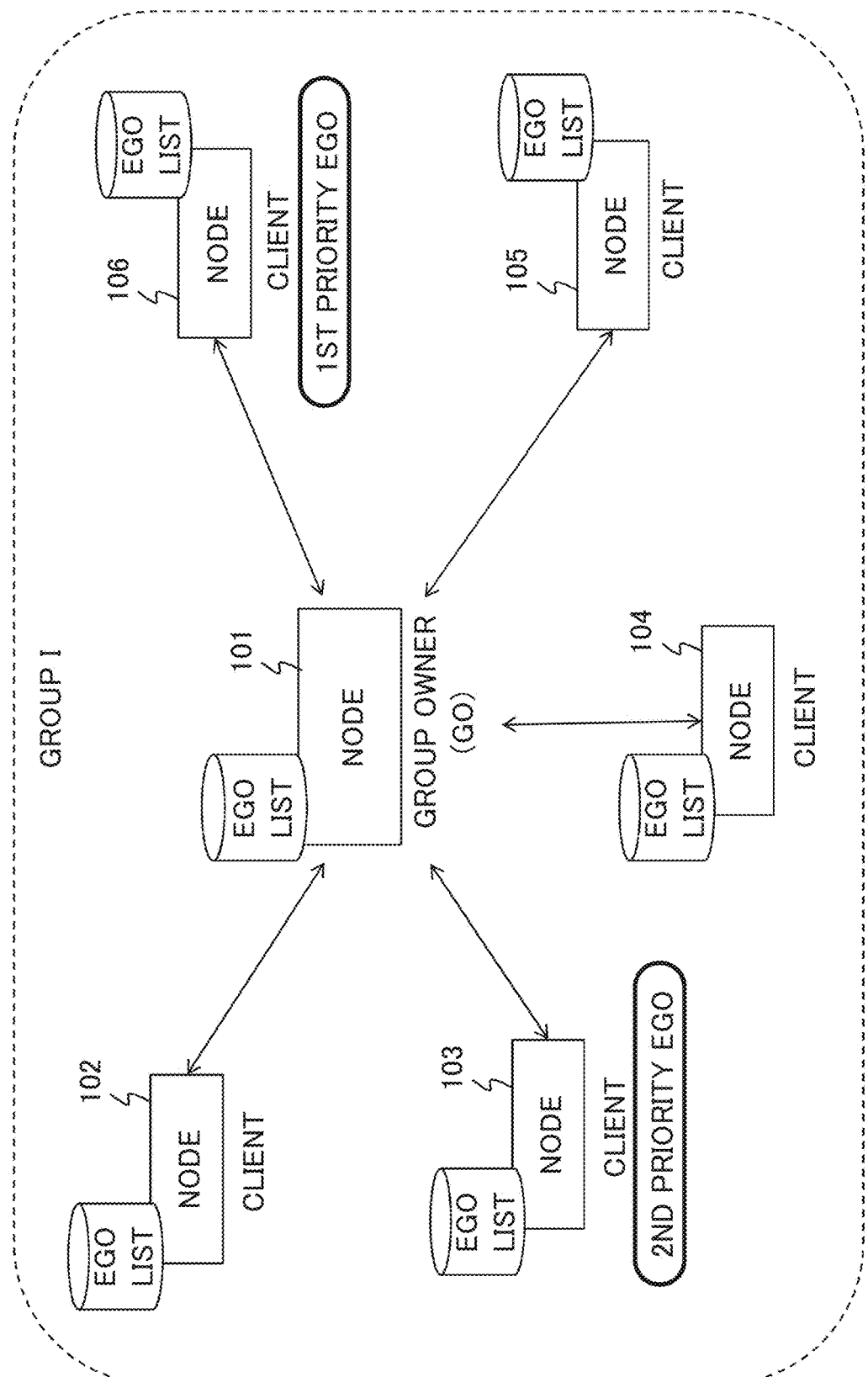
FIG. 1 is a schematic diagram showing a wireless peer-to-peer (P2P) network for explaining an EGO-based mechanism according to an embodiment of the present invention.

As illustrated in FIG. 1, six nodes 101-106 form a typical Wi-Fi Direct group, in which the node 101 operates as a Group Owner (GO) and other nodes 102-106 operate as associated Clients, respectively. The GO node 101 prepares a list of Emergency Group Owner nodes (EGO list), which is shared with the client nodes 102-106 every time it is refreshed/updated, else periodically, based on instantaneous leadership capability credentials of the group members. More specifically, at the time of formation of a new group, the nodes intending to form a group include their EGO intent in the connection request frames of P2P group formation. EGO nodes are selected based on EGO metrics of all the clients having the EGO intent of being an Emergency Group Owner. The metric is calculated based on device capability credentials by which an EGO list is prepared in descending order of priority, the client with highest metric being positioned at the top of the list. The list is regularly updated/refreshed when there is a change in credential for an existing device, or a new device with higher credentials joins the group. The list is shared with all the associated clients.

When the GO node 101 disappears, the EGO nodes become Autonomous Group Owners and start transmitting beacons. Among all the received EGO beacons, a client connects to the EGO node with highest EGO metric. It is preferable for the EGO node to send an invitation request using the credentials (security key) of the previous session. The invitation process skips the GO negotiation and the initial part of WPS (Wireless Protected Setup) Provisioning Phase, allowing considerably reduced reconnection time.

The EGO-based mechanism is extremely useful for transfer of Group Ownership among members of a Wi-Fi Direct group for load-balancing or any other application that requires such action related to dynamic topology reformation. As described above, the P2P-Invitation mechanism is preferably used to expedite the reconnection.

However, specifications of the released Wi-Fi Direct standard allow two devices to form a group using P2P-Invitation mechanism only if they have a history of past association as Group Owner and Client. According to an exemplary embodiment of the present invention, the persistent group formation mechanism can be used for quick group reformation between nodes having no history of leader-client relationship.

1.2) Quick Group Reformation

A simplified example of the quick group reformation will be briefly described by reference to FIG. 2.

Figure 2:
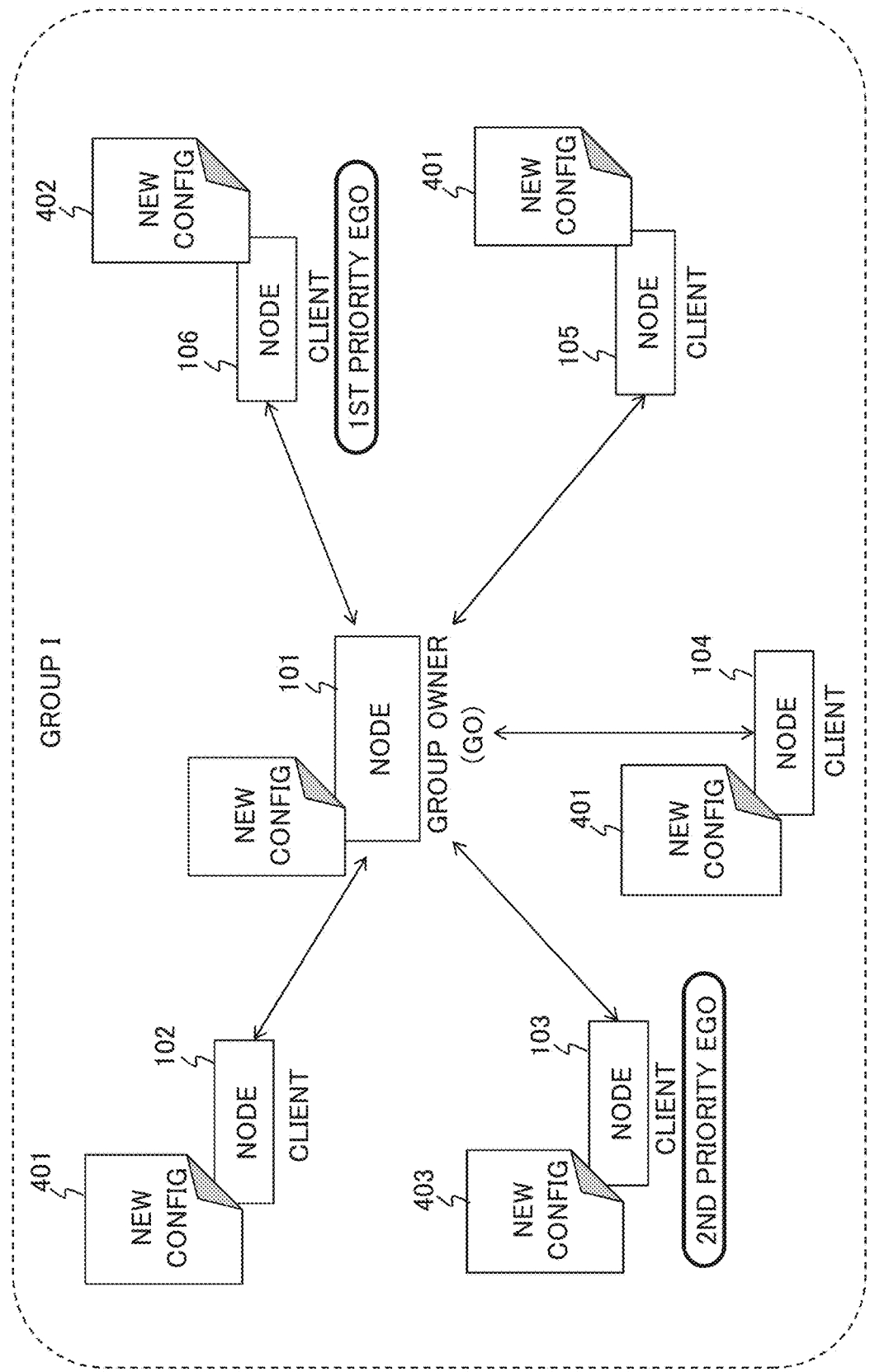
FIG. 2 is a schematic diagram showing the wireless peer-to-peer (P2P) network for explaining a quick group reformation mechanism according to the embodiment of the present invention.

As illustrated in FIG. 2, six nodes 101-106 form a typical Wi-Fi Direct group, in which the node 101 operates as a Group Owner (GO) and other nodes 102-106 operate as associated Clients, respectively. According to the exemplary embodiment of the present invention, immediately after receiving the EGO information and security credentials from the GO node 101, every node other than EGO nodes 103 and 106 creates a virtual persistent P2P group configuration 401. This configuration 401 contains information about a persistent group with $1^{st}$ priority EGO node 106 and $2^{nd}$ priority EGO node 103 as persistent group owners and the security credentials of that persistent group from the GO node 101. Thus the configuration 401 keeps record of a virtual persistent group that was never formed in reality.

Further, immediately after receiving the EGO information and security credentials from the GO node 101, the EGO nodes 106 and 103 create virtual persistent P2P group configurations 402 and 403, each of which contains, as described later, two separate network blocks: the first network block corresponding to one of the virtual persistent groups of the two EGO nodes 103 and 106; and the second network block corresponding to the other. All the group members use identical information for generating the configuration of same persistent group. The configuration can be extended for multiple EGO nodes in the same way.

As described above, when the GO node 101 sends EGO list and credentials to its group members, all group members prepare a virtual persistent group configuration; the normal client nodes 102, 104 and 105 prepare the configuration 401; and the EGO nodes 106 and 103 prepare the configuration 402 and 403, respectively, using the information received from the incumbent GO node 101. When the GO node 101 makes a change to the EGO list or other credentials required for creating the configuration, the group members immediately update their virtual configuration accordingly.

When the GO node 101 disappears from the group, the $1^{st}$ priority EGO node 106 assumes Autonomous GO-ship (a mechanism detailed in the specification of Wi-Fi Direct wherein a Wi-Fi P2P device declares itself as GO and starts its own group autonomously without engaging in GO Negotiation with other nodes) of the persistent group and starts sending beacons. It may send invitation request to the other nodes to invoke the virtual persistent group and, when the $1^{st}$ priority EGO node 106 has received an invitation response to the invitation request from the nodes 102, 103, 104 and 105, a new group consisting of a new GO node 106 and Client nodes 102-105 is formed. In this way, a persistent P2P group is created. However, the invitation process may also be initiated from the client side wherein the client nodes listen to the beacon of the EGO and sends invitation request to it. The EGO responds to the request and persistent group is formed.

1.3) Effects

As described above, by employing the persistent group formation mechanism between nodes having no history of leader-client relationship, the time spent in group disruption starting from when the GO left to when all clients reconnect to the EGO as their new GO is drastically reduced, compared to standard P2P group formation mechanism.

2. Exemplary Embodiment

Hereinafter, an exemplary embodiment of the present invention will be described according to Wi-Fi Direct Standard as an example. The exemplary embodiment is discussed in its complete details with accompanying figures and finally explained with a typical example scenario.

2.1) System Configuration

In the network system as shown in FIG. 2, the nodes 101-106 have the same configuration but may operate as GO or Client. Details of node functionality will be described by reference to FIG. 3.

<Node Configuration>

Figure 3:
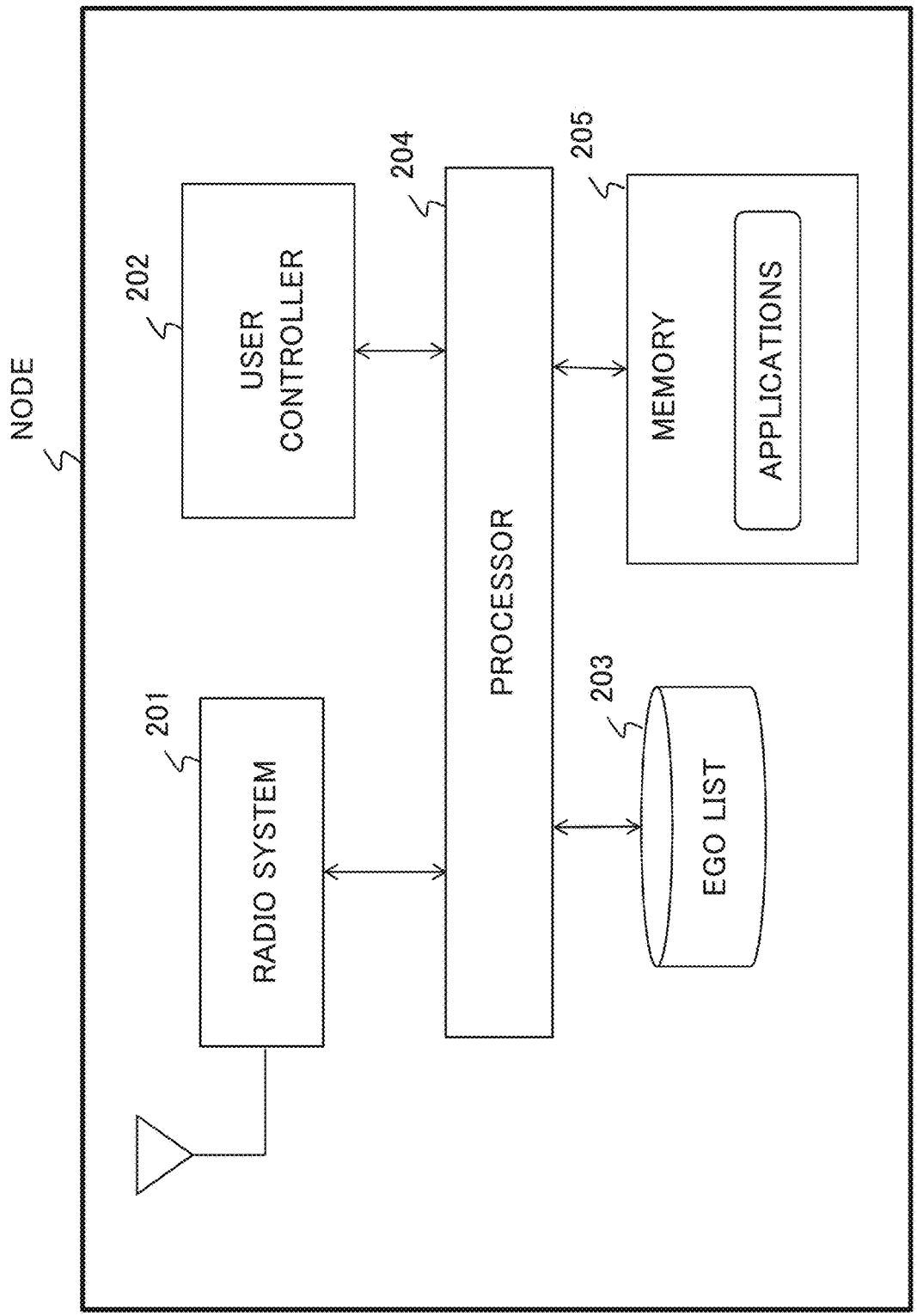
FIG. 3 is a block diagram showing the functional configuration of a node according to an exemplary embodiment of the present invention.

Referring to FIG. 3, the node includes the following functionalities: a radio system 201, a user controller 202, an EGO list 203, a processor 204, and a memory 205. The radio system 201 includes a Wi-Fi Direct communication function. The user controller 202 controls Wi-Fi Direct connection procedures such as Device Discovery, GO Negotiation and Provisional Service Discovery. The EGO list 203 contains EGOs and information on a virtual persistent group. The EGOs in the EGO list 203 are selected in descending order of priority based on their device capabilities and other metrics. The information on a virtual persistent group includes a security credential of the virtual persistent group such as a pre-shared security key of the virtual persistent group session. The processor 204 can execute the operating system and applications stored in the memory 205 including generating virtual persistent group configuration and group reformation according to the present embodiment. The EGO list 203 may be included in the memory 205 or a separate storage device such as a semiconductor memory.

<EGO List>

As illustrated in FIG. 4, the EGO list 203 contains at least information of EGOs which are identified by node identification (e.g. MAC address) and pre-shared security key, SSID and BSSID of a virtual persistent group session. The EGO list is prioritized; priority can be determined based on factors like the position index of an EGO, power availability, device type, processing speed, memory size, antenna gain etc. It is preferable to restrict the maximum number of entries in the EGO list 203. The EGO list 203 is created at the GO node 101 and is shared with all the associated client nodes, allowing the client nodes to create virtual persistent group configuration even staying connected to its incumbent group and later perform group reformation at the time of the disappearance of the GO node 101. The EGO list may contain additional information like frequency channel corresponding to every EGO. The frequency channel for every EGO may be designated to be same as the channel of incumbent GO, or each EGO can be assigned some other channel as well. This will eliminate the time taken by client nodes to discover the EGO node by scanning on all channels after the GO disappears.

Immediately after receiving the EGO information and security credentials from the GO node 101, every current Client node (102-106) creates a virtual persistent P2P group configuration labeled with reference numeral 401. This configuration 401 contains information about a persistent group with $1^{st}$ priority EGO and $2^{nd}$ priority EGO as persistent group owners and the security credentials sent by the GO node 101 as the security credential of that persistent group. Thus the configuration keeps record of a virtual persistent group that was never formed in reality.

<Virtual Persistent Group Configuration>

Figure 5:
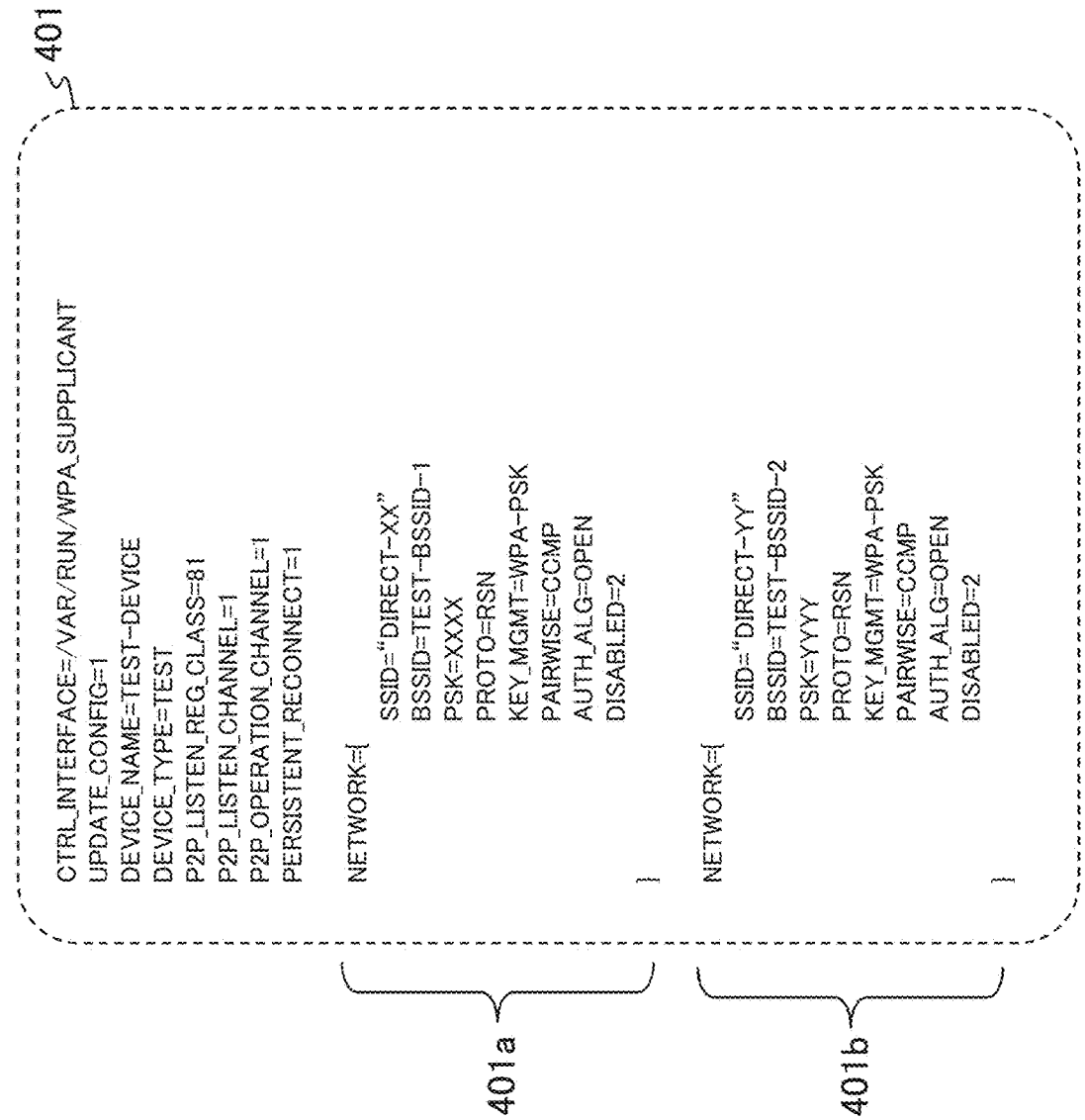
FIG. 5 is a schematic diagram showing an example of virtual configuration of persistent group generated by a client node according to the exemplary embodiment of the present invention.

FIG. 5 shows an example of the configuration 401 of each client node with least information in a Wi-Fi P2P group with two EGO nodes 103 and 106 shown in FIG. 2. The configuration 401 contains two separate network blocks 401a and 401b, each corresponding to the virtual persistent group with two different EGO nodes 106 and 103.

Persistent Reconnect field is set to unity to enable the persistent mechanism of group formation. The BSSID corresponding to each persistent group may be informed by the incumbent GO node 101. For example, it can be the MAC address of the corresponding EGO node. The other important credentials (for example, SSID, Pre-shared key or any other related information) required for creating such configuration may also be sent by the incumbent GO node 101. All the group members use identical information for generating the configuration of same persistent group. The configuration can be extended for multiple EGOs in the same way.

For example, if the EGO list 203 contains only one EGO node, then all clients create only one network block by configuring this EGO node as their persistent GO node. The MAC address of the EGO node is used as the BSSID of the persistent group. The SSID and security credentials like pre-shared key (PSK) of this persistent group are either pre-defined or received from the incumbent GO node. All the nodes use the same BSSID, SSID and other security credentials (like PSK) to ensure that they all are part of the same persistent group. In another example where there are multiple EGO nodes in the EGO list, multiple network blocks are created in the configuration file of each group member, configuring each EGO node as persistent GO node in separate network blocks. Each EGO's MAC address is used as the BSSID in its corresponding network block. The other parameters like SSID, PSK can be used as informed by the incumbent GO node or any pre-defined password. The EGO node(s) on the other hand do similar steps with little difference as explained next with examples.

Figure 6:
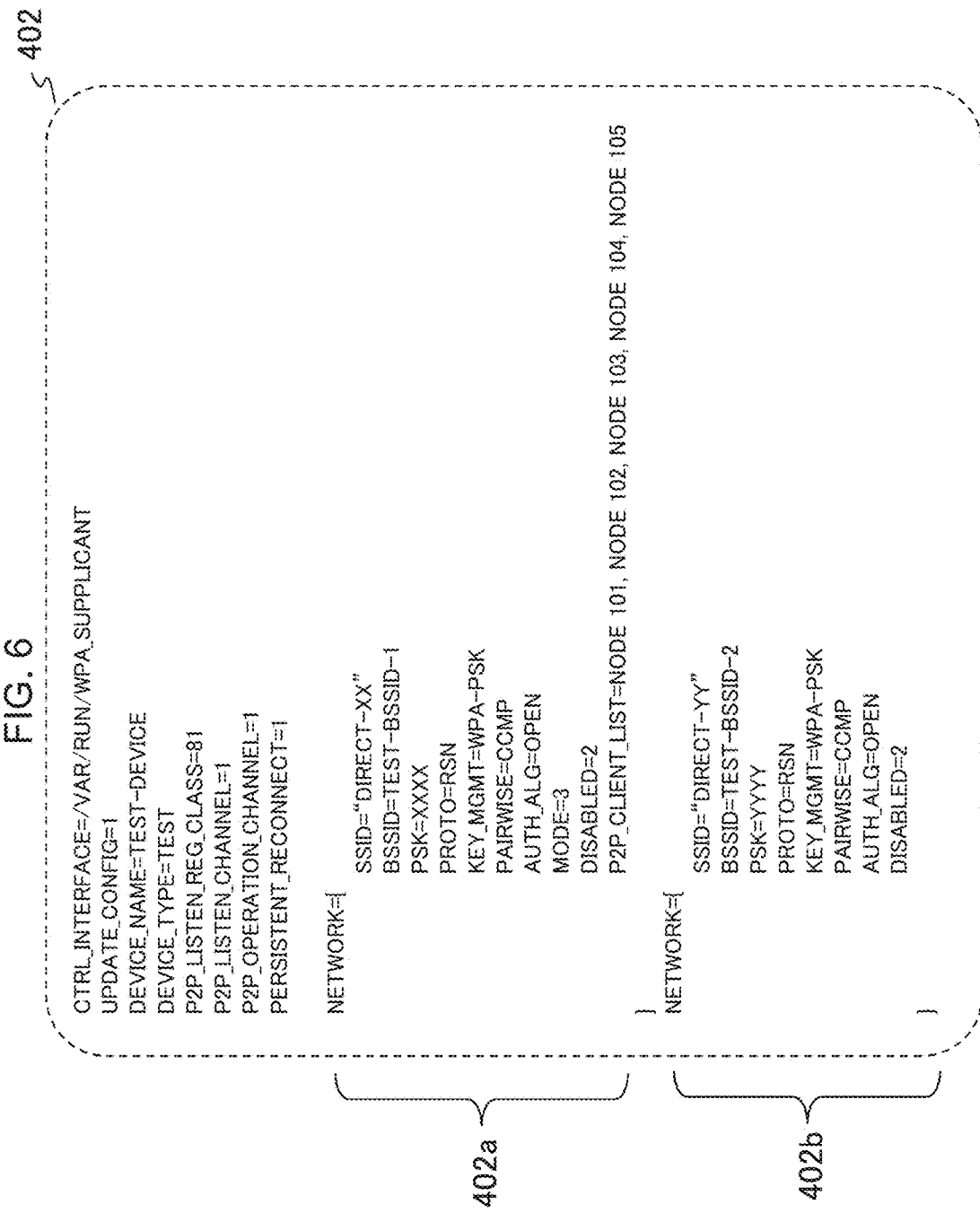
FIG. 6 is a schematic diagram showing an example of virtual configuration of persistent group generated by an EGO node according to the exemplary embodiment of the present invention.

FIG. 6 shows an example of the configuration 402 of the 1st EGO node 106 with least information in a Wi-Fi P2P group with the two EGO nodes shown in FIG. 2. The configuration 403 of the 2nd EGO node 103 is substantially similar to the configuration 402. The configuration contains two separate network blocks 402a and 402b, each corresponding to the virtual persistent group with a different one of the two EGO nodes 106 and 103.

The first network block 402a represents the virtual persistent group with itself as the persistent GO node. Thus along with other information, it also contains the list of members of its incumbent group as its persistent clients in the P2P client list. The P2P client list shown in the figure is exemplary, it may contain node identification parameters like MAC address. The second network block 402b features the $1^{st}$ EGO node 106 as a client to the $2^{nd}$ EGO node 103. As described above, Persistent Reconnect field is set to unity to enable the persistent mechanism of group formation. The BSSID corresponding to each persistent group may be informed by the incumbent GO node 101. For example, it can be the MAC address of the corresponding EGO node. The other important credentials (for example, SSID, Pre-shared key or any other related information) required for creating such configuration may also be sent by the GO node 101. All the group members use identical information for generating the configuration of same persistent group. The configuration can be extended for multiple EGO nodes in the same way.

For example, if there is only one EGO node in the EGO list, the EGO node creates only one network block by configuring itself as persistent GO node and all other member of the incumbent group as its persistent P2P client. It uses its own MAC address as the BSSID of the persistent group. The SSID and security credentials like pre-shared key (PSK) of this persistent group are either pre-defined or received from the incumbent GO node. In another example, consider there are three EGO nodes in the EGO list. Every EGO node will create three network blocks in its configuration file. The $1^{st}$ EGO node will configure itself as the persistent GO node with all other members as its persistent client in one of its three network blocks. In the second network block it will configure the $2^{nd}$ priority EGO node as the persistent GO node. And in the third network block, it will assign the $3^{rd}$ priority EGO node as its persistent GO node. The other EGO nodes also replicate the same mechanism.

2.2) Group Reformation

<In the Presence of Incumbent GO>

Figure 7:
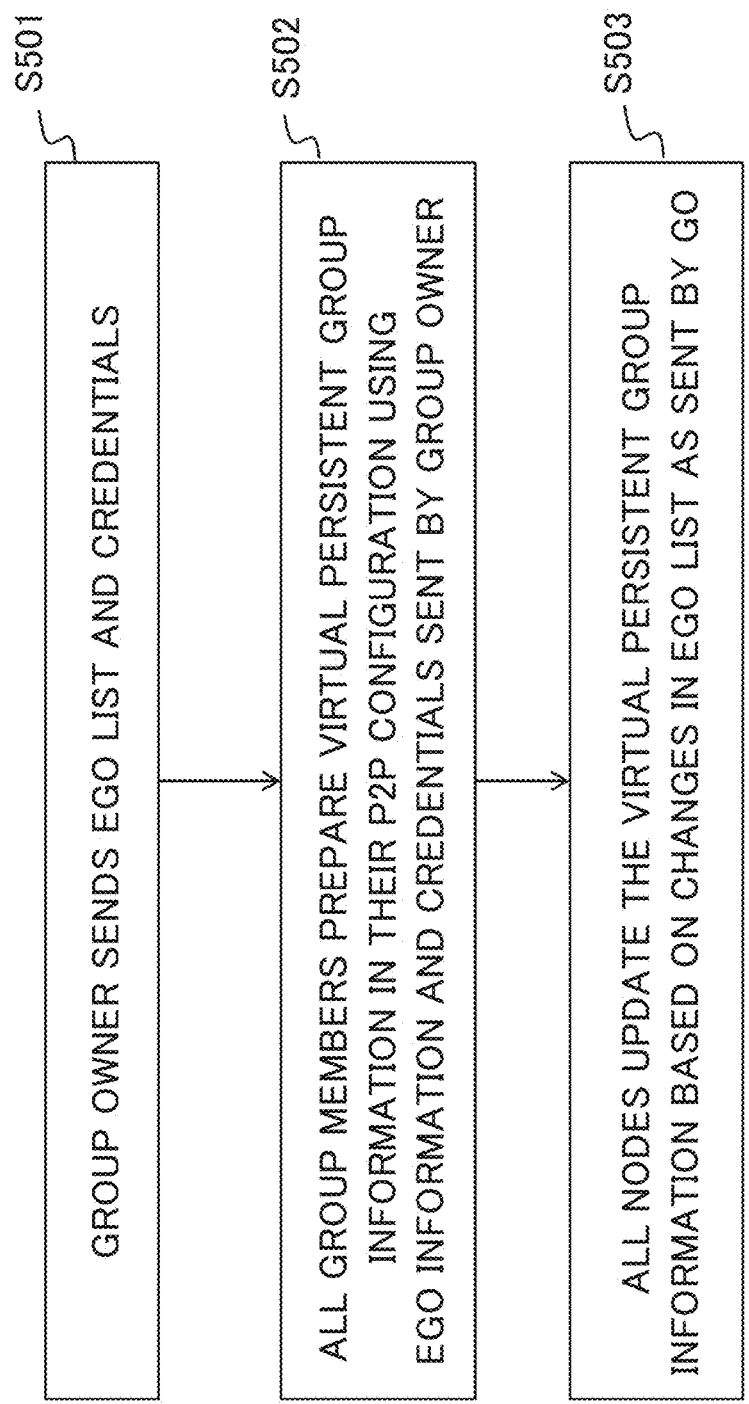
FIG. 7 is a flowchart showing the mechanism of generating virtual persistent group configuration according to the exemplary embodiment of the present invention.

Referring to FIG. 7, when the GO node 101 sends the EGO list 203 and credentials to its group members (Operation S501), all group members prepare a virtual persistent group configuration; the normal client nodes 102, 104 and 105 prepare the virtual persistent group configuration 401 and the EGO node 103 and 106 prepare the virtual persistent group configuration 402, using the information sent by the incumbent GO node 101 (Operation S502). As and when there is a change made by the GO node 101 in the EGO list or other credentials required for creating the configuration, the group members immediately update their virtual configuration accordingly (Operation S503).

As described before, the EGO list 203 which contains EGOs and the security credentials is shared among the group member nodes right at the time of Group formation. As the GO node 101 keeps adding new clients to its group, based on the EGO intent and EGO metric, it keeps preparing and updating a prioritized list of k EGO nodes as shown in FIG. 4. The EGO list 203 is refreshed or updated based on changes and periodically shared with the associated clients throughout the duration of group session. This is to allow the nodes to be prepared for the exit of the GO node 101, with or without prior notice. The clients save the last-received EGO list 203.

Once the clients receive the EGO list 203, they update their configuration file of the incumbent Wi-Fi P2P group, adding new persistent network blocks, configuring each EGO as their persistent GO in separate network blocks as shown in FIG. 5. The network blocks are automatically created in the configuration file of each node when two nodes form a persistent group. This information is reused to initiate the persistent group at a later time. Such a method is very fast in terms of group formation in Wi-Fi P2P. All members seek information about the EGO node(s) from their incumbent GO node 101 and create the information of a virtual persistent group on their own in their configuration file while being associated with their incumbent GO node 101. This information is used when the GO leaves or transfers its leadership.

<After Disappearance of Incumbent GO>

Hereinafter, the operation after disappearance of the incumbent GO node 101 will be described by references to FIGS. 8-15.

Figure 8:
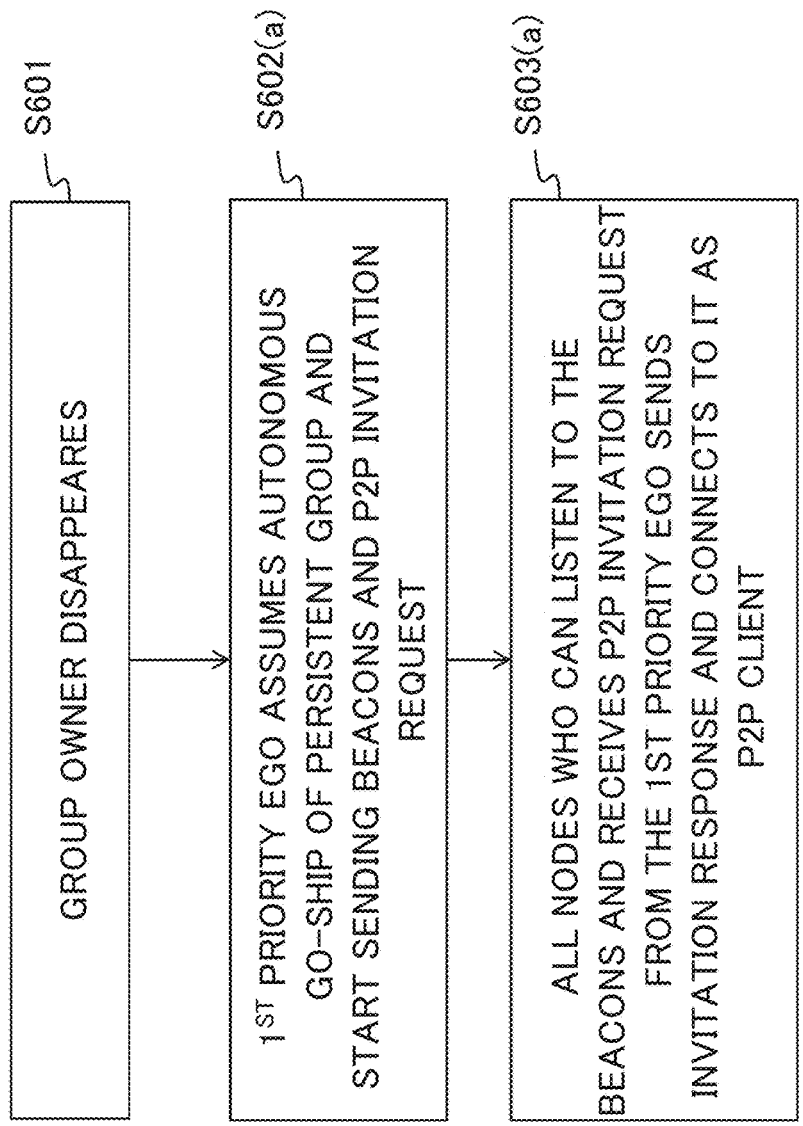
FIG. 8 is a flowchart showing a first example of invocation of persistent group when the GO node leaves according to the exemplary embodiment of the present invention.
Figure 9:
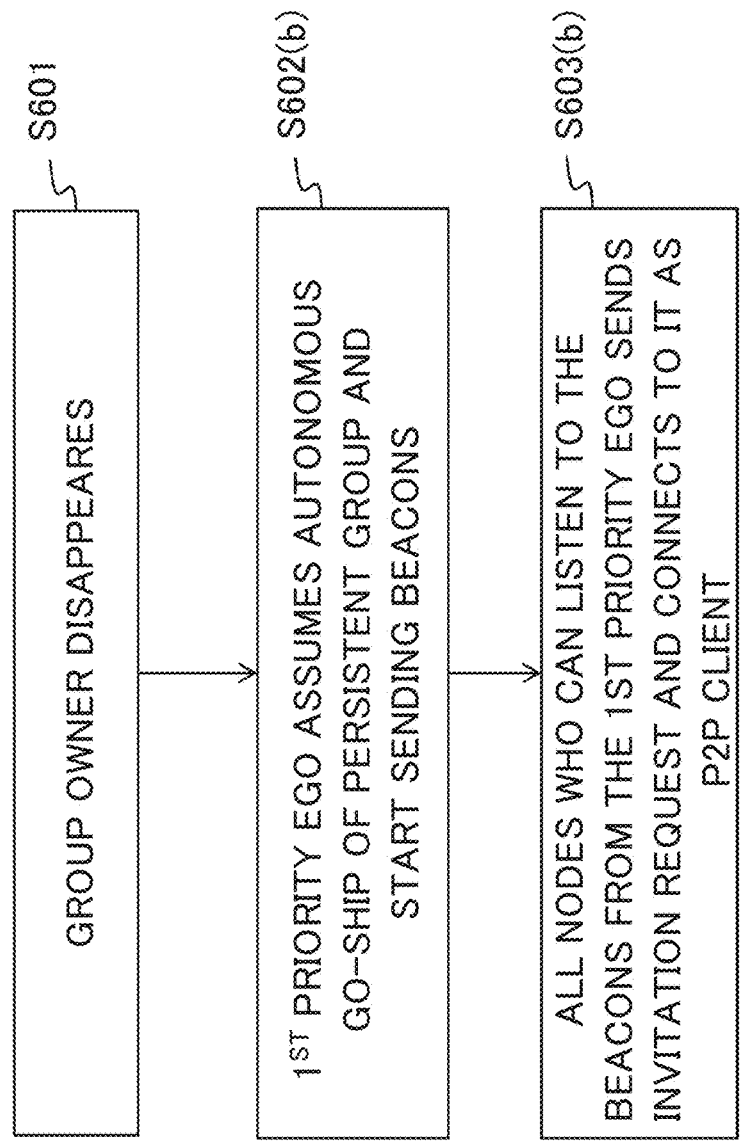
FIG. 9 is a flowchart showing a second example of invocation of persistent group when the GO node leaves according to the exemplary embodiment of present invention.
Figure 10:
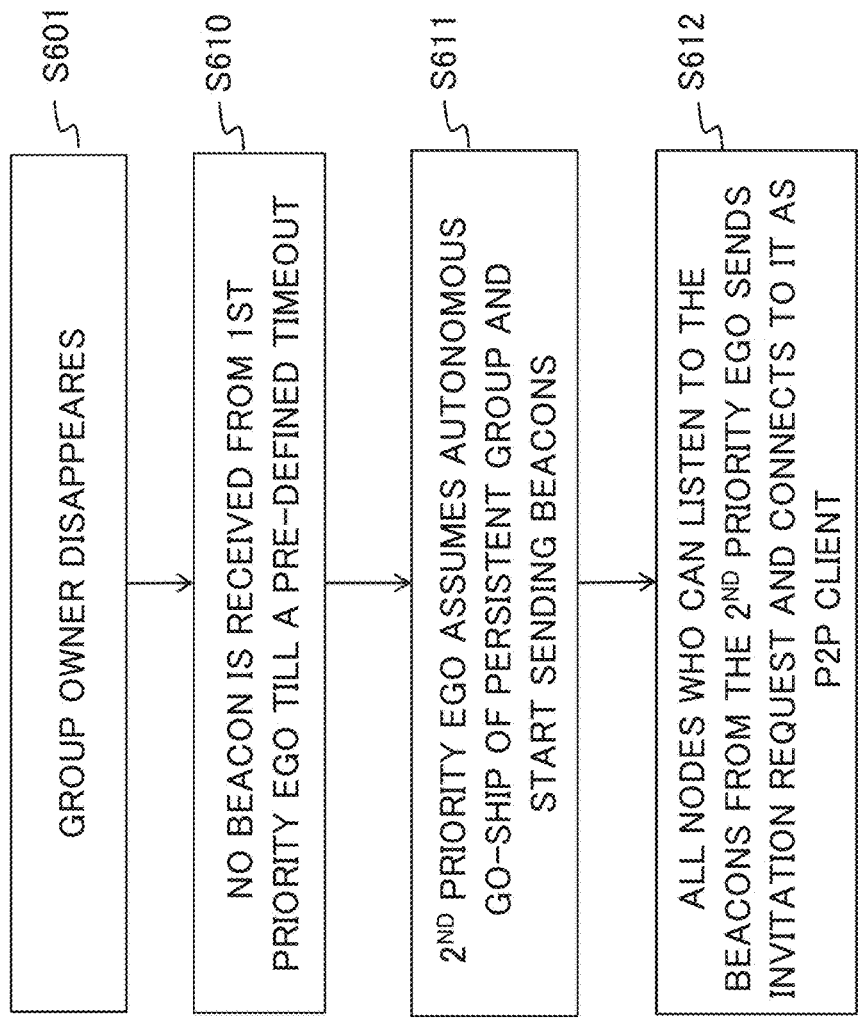
Figure 11:
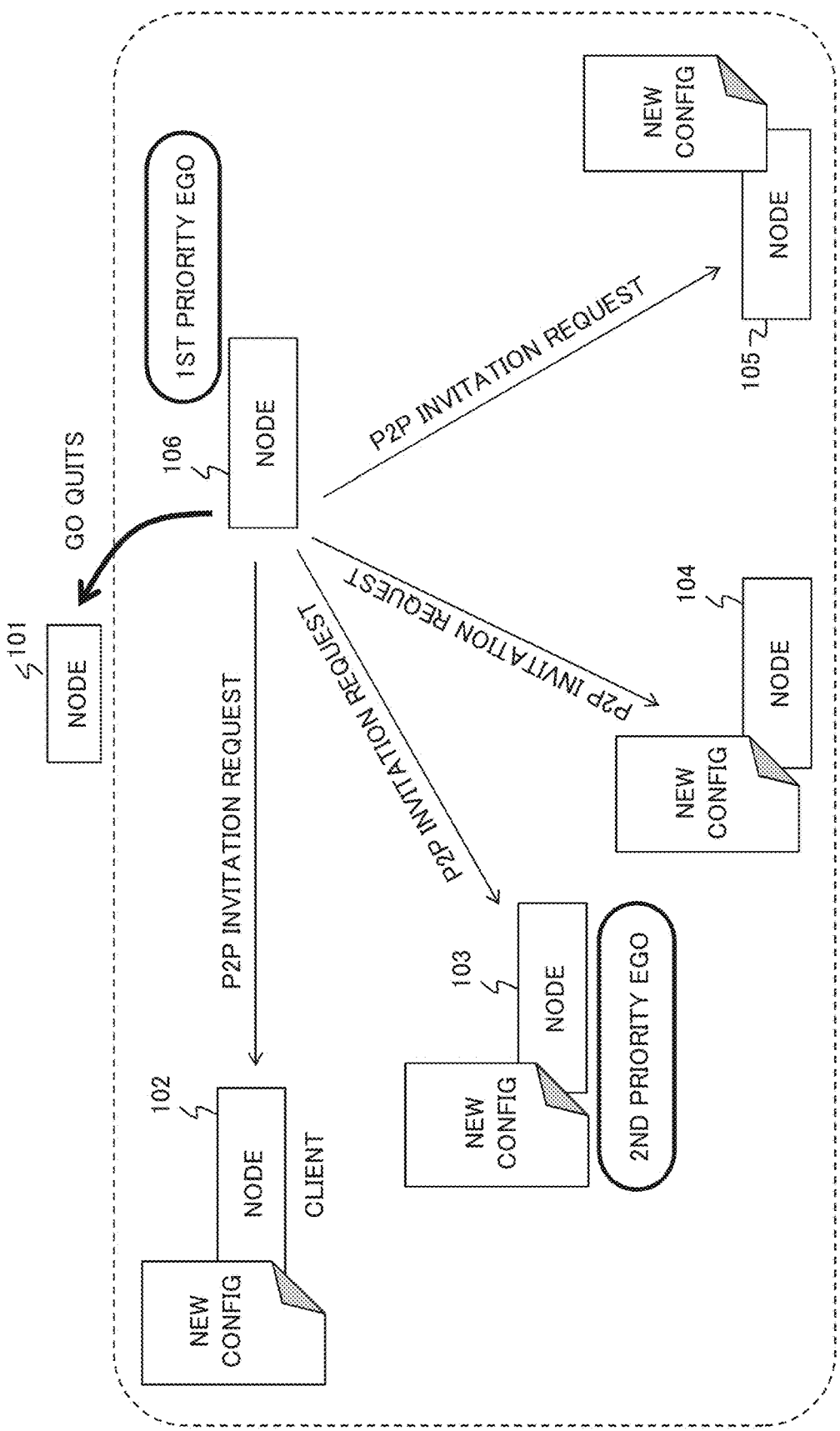
FIG. 11 is a diagram showing the operation of sending invitation request from the EGO node after assuming Autonomous GO-ship of persistent group according to the exemplary embodiment of the present invention.

Referring to FIG. 8, when it is detected that the GO node 101 disappears from the group (Operation S601), all members of the group may reconfigure themselves. By reconfiguring, they may set their P2P configuration as enlisted in their configuration. Thus, all members come to know about the existence of persistent P2P group with the EGO nodes 106 and 103 as GO. The $1^{st}$ priority EGO node 106 (or the $2^{ND}$ priority EGO node 103) from the EGO list becomes Autonomous GO and may send P2P Invitation Request to all the members of the previous group and waits for P2P Invitation Response (Operation S602(a) of FIG. 8 and see FIG. 11). Alternatively, after listening to the beacon of $1^{st}$ priority EGO, the invitation process may be initiated by the clients by sending invitation request to the EGO (Operation S602(b) of FIG. 9 and see FIG. 13). The beacon from $1^{st}$ priority EGO is preferably sent within a timeout period from the exit of the GO node 101. As described later, when the $1^{st}$ priority EGO node 106 has never sent the beacon within the predetermined timeout period (Operation S610 of FIG. 10), a next lower-priority EGO node, that is, the $2^{ND}$ priority EGO node 103, assumes Autonomous GOship starts sending beacons (Operation S611 of FIG. 10). Operation S611 and S612 of FIG. 10 may also happen in the similar fashion as S602(a) and S603(a) with the $1^{st}$ priority EGO replaced by $2^{nd}$ priority EGO; which means the invitation process can be initiated from either $2^{nd}$ priority EGO or client side.

Figure 12:
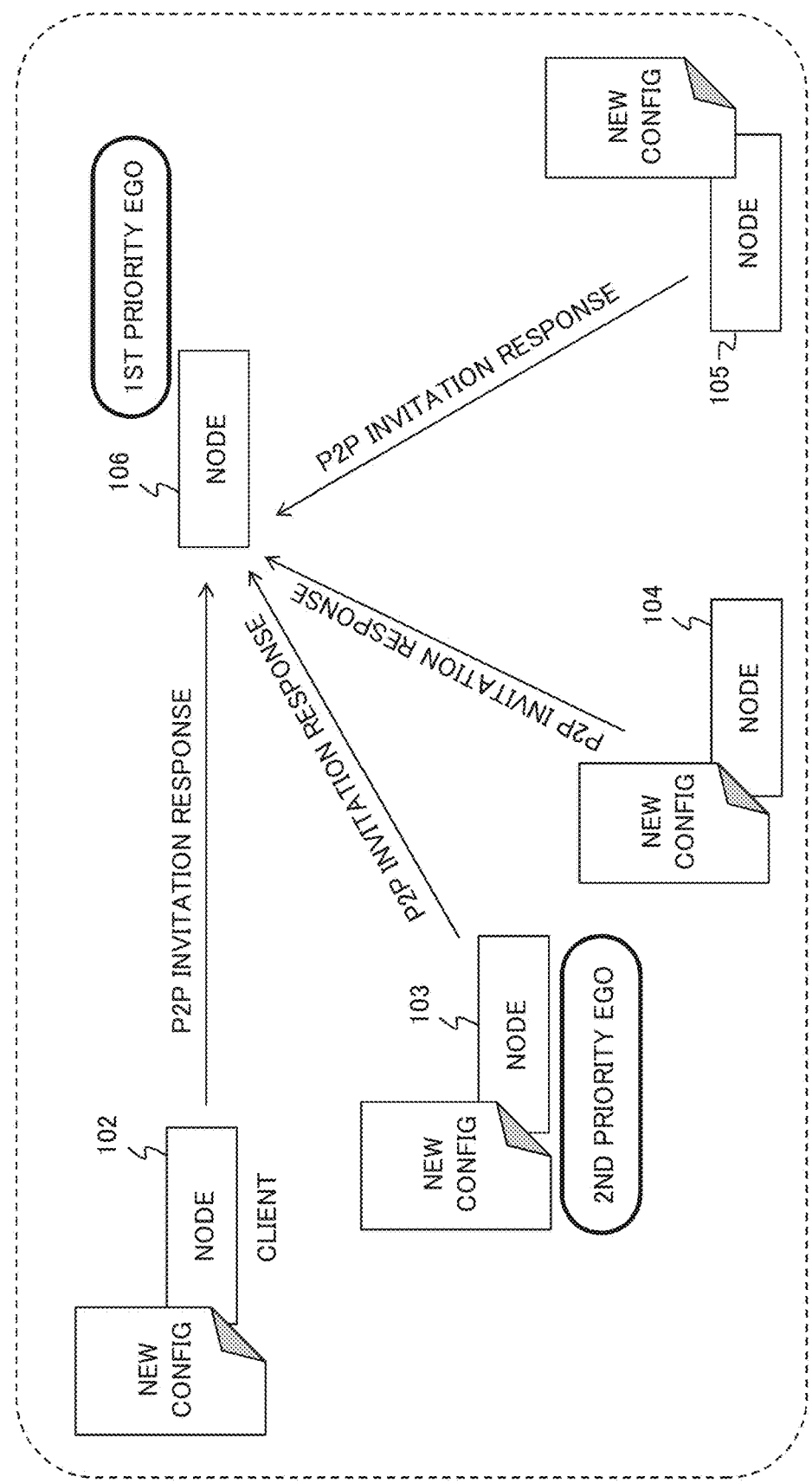
FIG. 12 is a diagram showing the operation of sending invitation response from the client nodes to the EGO node according to the exemplary embodiment of the present invention.
Figure 13:
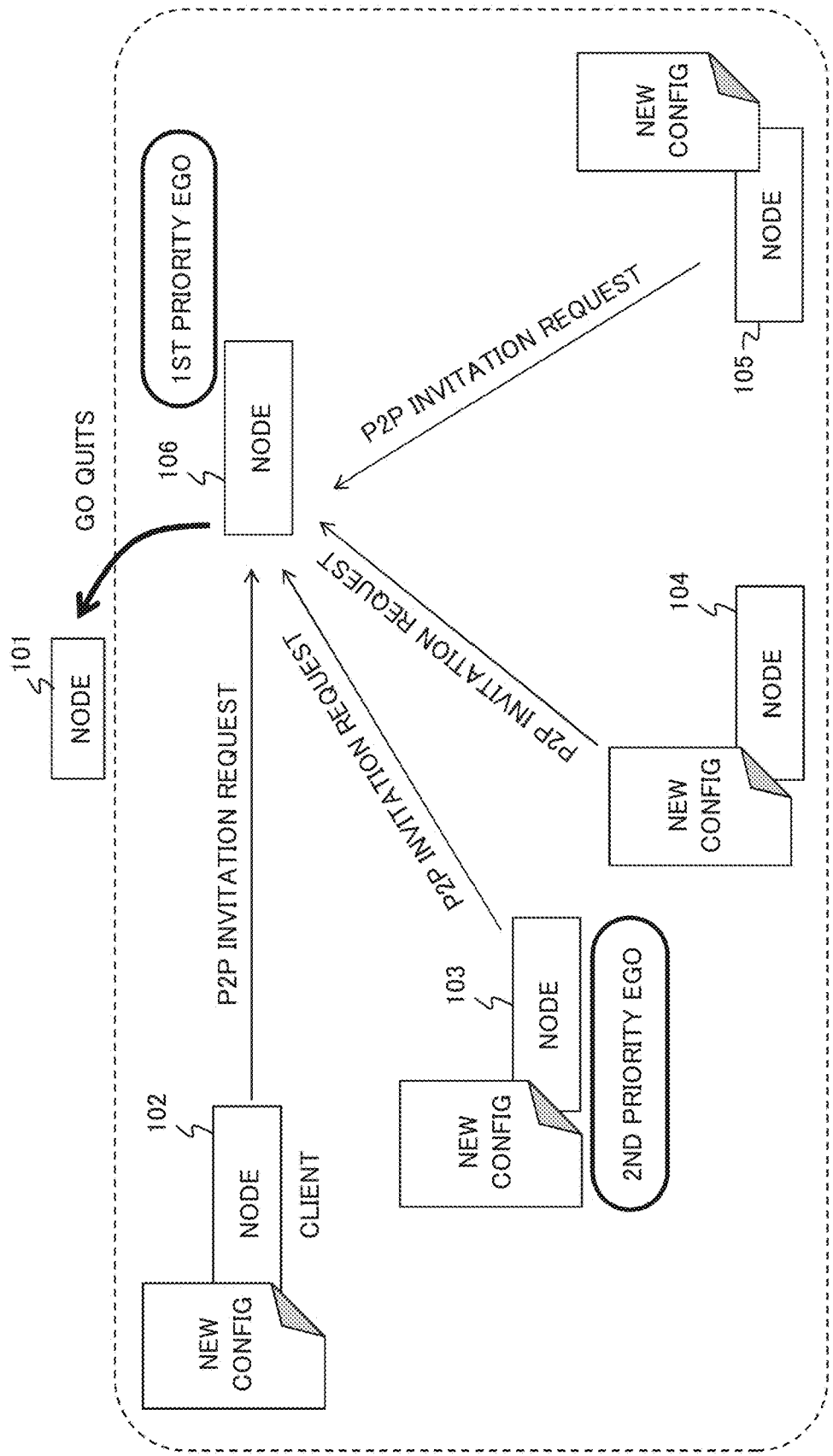
FIG. 13 is a diagram showing the operation of sending invitation request from the clients to the EGO node after listening to the beacon from the Autonomous Persistent EGO according to the exemplary embodiment of the present invention.
Figure 14:
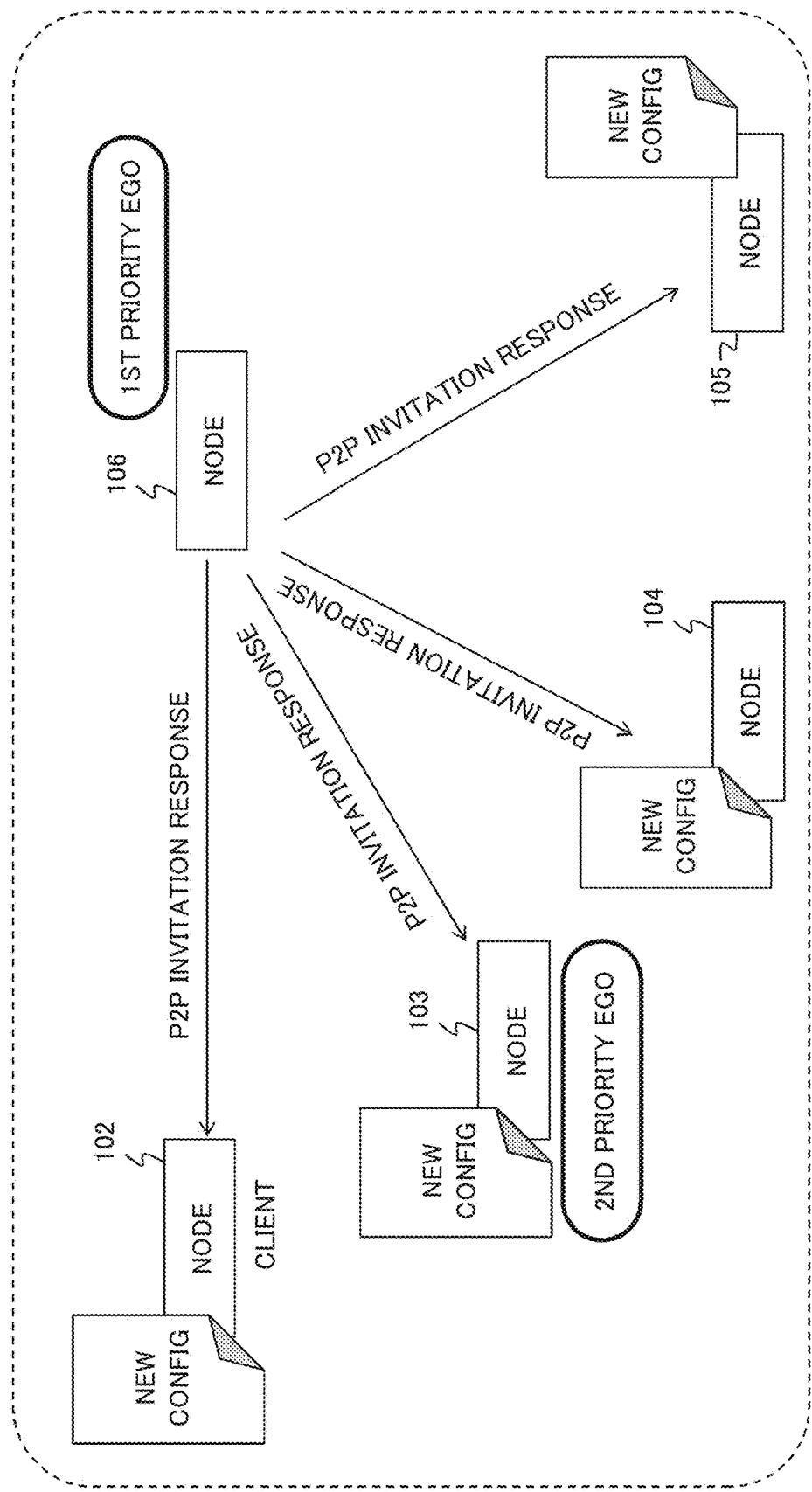
FIG. 14 is a diagram showing the operation of sending invitation response from the Autonomous Persistent EGO node to the client nodes according to the exemplary embodiment of the present invention.

On receiving the beacon and invitation request, all members respond to the $1^{st}$ priority EGO node 106 (or the $2^{ND}$ priority EGO node 103) with P2P Invitation Response (Operation S603(a) and see FIG. 12). Alternatively, in the case where invitation is initiated by clients after listening to the beacon, the $1^{st}$ priority EGO node 106 (or the $2^{ND}$ priority EGO node 103) sends invitation response to the requestee node (FIG. 14). Thus, using the information of the virtual persistent group that was added in the configuration file as described before, a persistent P2P group is created. Thus the time spent in group disruption starting from when the GO node 101 left to when all clients reconnect to the EGO node 106 (or the $2^{ND}$ priority EGO node 103) as their new EGO is drastically reduced, compared to normal P2P group formation mechanism.

Figure 15:
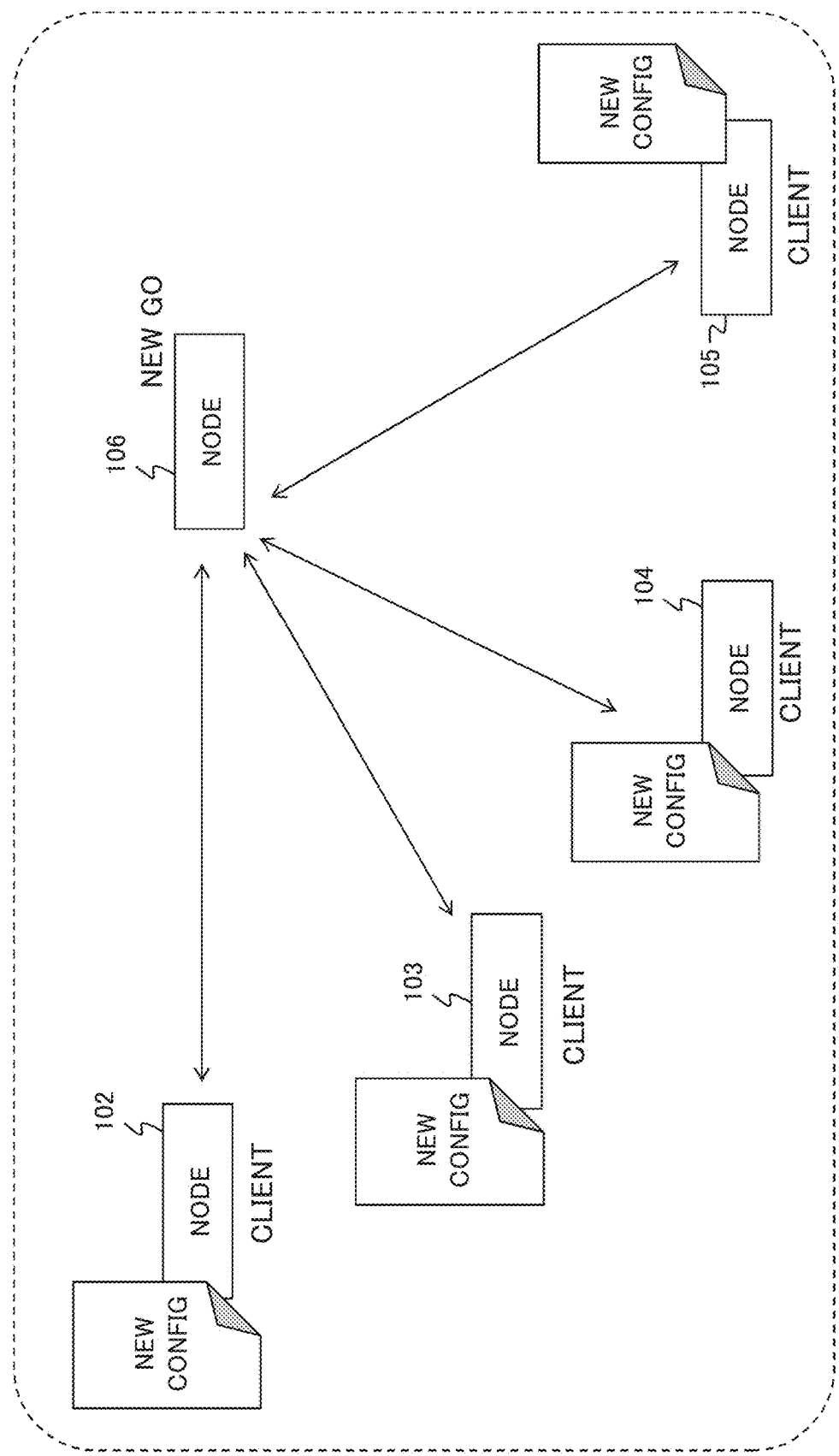
FIG. 15 is a diagram showing the formation of new group with the EGO node as the new GO according to the exemplary embodiment of the present invention.

FIG. 15 shows a new Wi-Fi P2P group has been formed with the $1^{st}$ EGO node 106 as the new GO. The new GO 106 starts the same process of preparing prioritized EGO list and sharing it with all the group members. Here, the intent for EGO-ship may be included in the invitation frames that are exchanged between the new GO node 106 with each of new client nodes 102, 103, 104 and 105. Based on the intents, EGO capability credentials can be asked from the interested members, which may also be included in the vendor specification attribute field of the invitation frames. Thus the new GO node 106 starts preparing EGO list right from the time of invoking persistent group by invitation and shares the list with every member. All the members prepare new virtual configuration for persistent group, either by replacing previous configuration or appending to the previous configuration. The rest of the process is same as explained earlier.

3. System Operations

Hereinafter, group formation and group reformation of nodes will be described by references to FIGS. 16-19. For simplicity, five nodes are labeled with Node1 to Node5, respectively.

3.1) First Example

Figure 16:
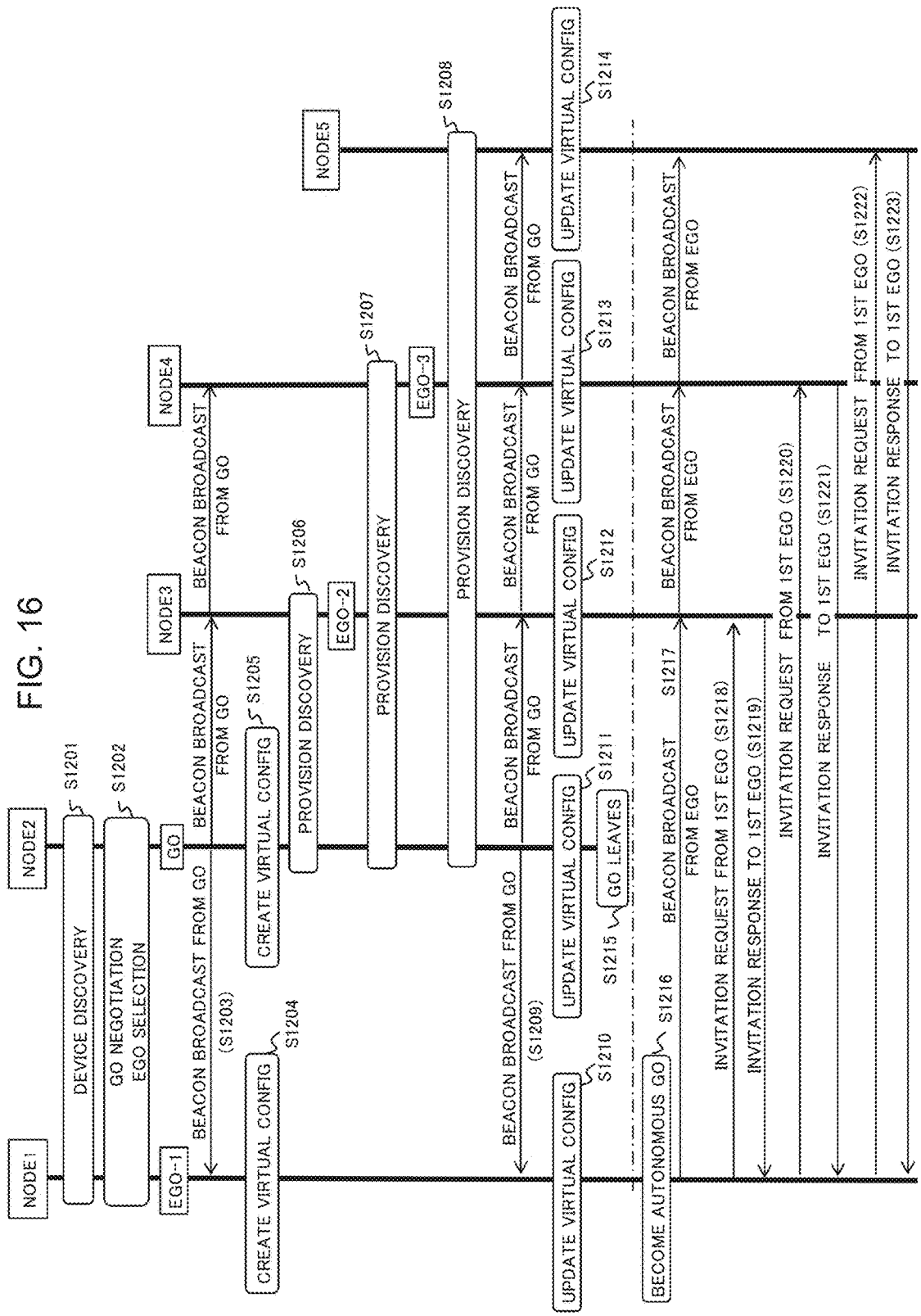
FIG. 16 is a timing sequence showing a first example of Wi-Fi Direct operation according to the exemplary embodiment.

Referring to FIG. 16, Node1 and Node2 initially start device discovery (Operation S1201) following the specified mechanism of Wi-Fi P2P by alternately listening on the channels and sending probe request frames. After that, Node1 and Node2 enter GO Negotiation and EGO Selection Phase by exchanging their GO intent, EGO intent and capability credentials for acting as EGO (Operation S1202). By the end of this Operation S1202, one node takes up the role of GO and the other node is assigned the role of client and EGO, subject to fulfilling the above-described requirements. Here, it is assumed that Node2 acts as GO and Node1 acts as Client.

The GO Node2 periodically broadcasts a beacon including information on GO-Client information (Operation S1203). Configuration of a virtual persistent group is created by Node1 and Node2 (Operations S1204 and S1205). Node3, Node4 and Node5 sends provision discovery frames respectively to Node2 (Operations S1206, S1207 and S1208). During the Operations S1206 and S1207, Node3 and Node 4 are respectively assigned the role of $2^{nd}$ and $3^{rd}$ priority EGO. This list of EGOs is included in the periodic beacons and shared regularly (Operation S1209). All nodes update their virtual configurations including information about the new EGOs (Operations S1210-S1214).

When the GO Node2 leaves the group (Operation S1215), Node1 who is also the $1^{st}$ EGO node becomes Autonomous GO of the persistent group and starts sending invitation request to Node3, Node4 and Node5 (Operations S1216, S1218 and S1220). In response to the invitation request, Node3, Node4 and Node5 send invitation responses to the GO Node1, respectively (Operations S1217, S1219 and S1221) and invoke the virtual persistent group.

3.2) Second Example

Figure 17:
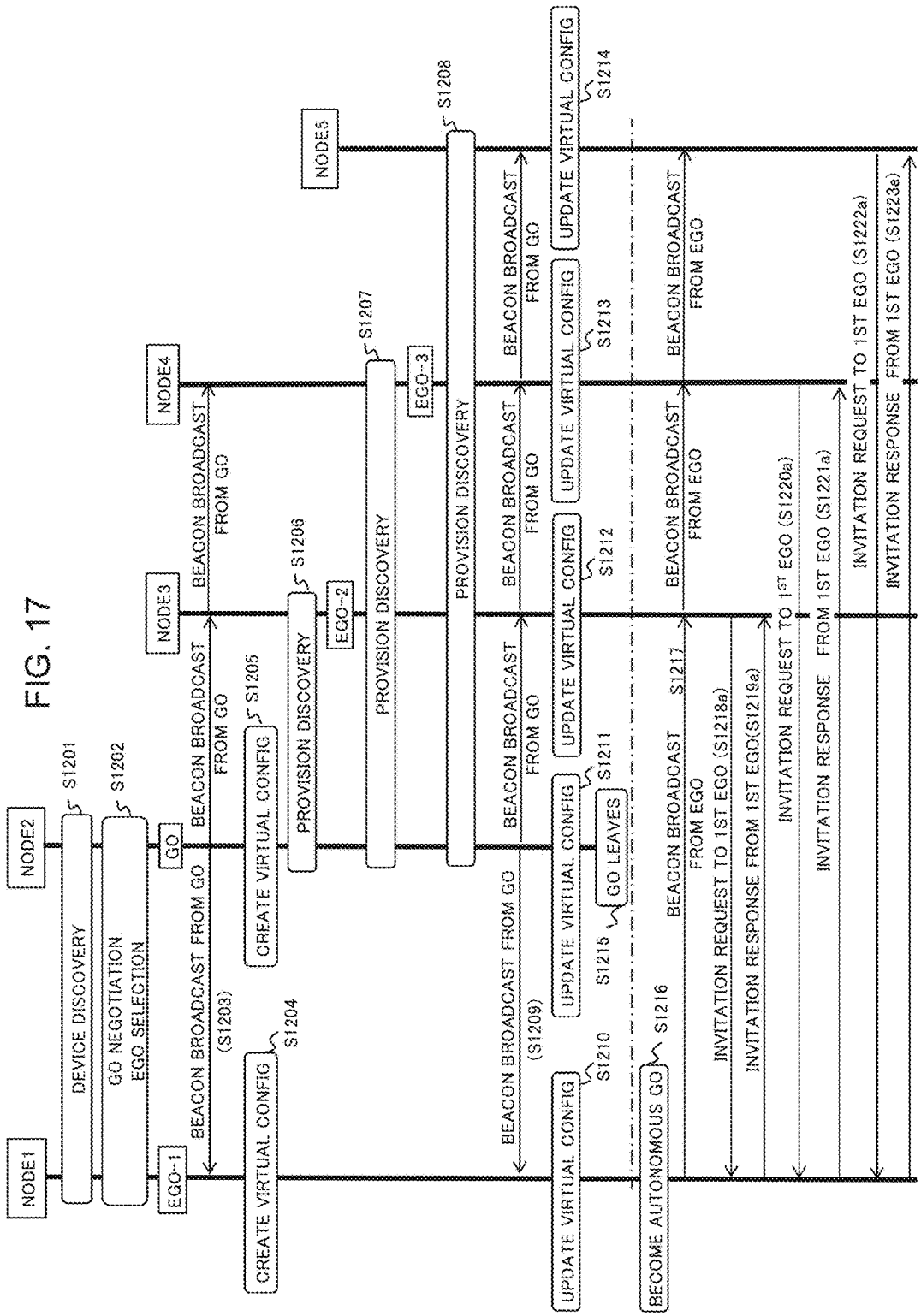
FIG. 17 is a timing sequence showing a second example of Wi-Fi Direct operation according to the exemplary embodiment.

Alternatively, invitation request may be sent from the client to the $1^{st}$ EGO after listening to the beacon of $1^{st}$ EGO as shown in FIG. 17.

In FIG. 17, all steps are same as described in FIG. 16 excepting the fact that invitation request is sent from the client to the $1^{st}$ EGO after listening to the beacon of $1^{st}$ EGO (Operations S1218a, S1220a and S1222a). The $1^{st}$ EGO then responds to the requesting client with an Invitation Response (Operations S1219a, S1221a and S1222a) and the persistent group is formed.

3.3) Third Example

Figure 18:
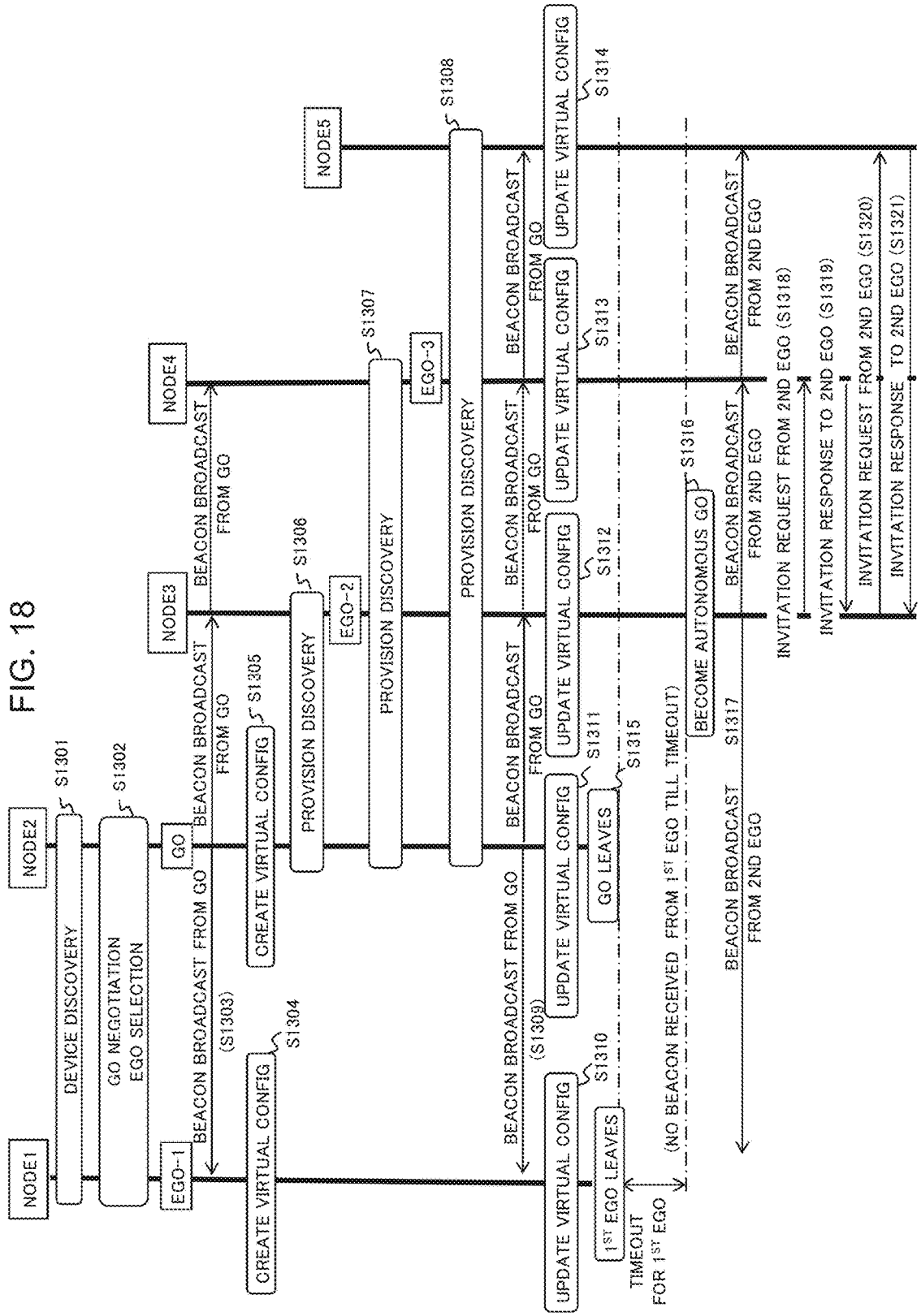
FIG. 18 is a timing sequence showing a third example of Wi-Fi Direct operation according to the exemplary embodiment.

In FIG. 18, operations S1301-S1315 are similar to the operations S1201-S1215 and therefore their details are omitted.

Referring to FIG. 18, once the GO Node2 leaves the group (Operation S1315), all nodes wait for a timeout period expecting beacon from the $1^{st}$ priority EGO Node1. In this example, we assume a case where the $1^{st}$ priority EGO also disappears with the GO. When the timeout occurs due to no beacon received from the $1^{st}$ priority EGO Node1, the $2^{nd}$ priority EGO Node3 becomes Autonomous GO and sends invitation requests to Node3, Node4 and Node5 respectively (Operations S1316, S1318 and S1320). These nodes respond to the $2^{nd}$ priority EGO Node3 with invitation response, respectively (Operations S1317, S1319 and S1321). In this case, the information in another network block of the configuration file about the virtual persistent group with the $2^{nd}$ priority EGO Node3 as persistent GO as described before is used to form a persistent group using P2P Invitation mechanism. Thus all nodes connect to the $2^{nd}$ priority EGO Node3 to form a new group.

If no P2P-Invitation Request is received by the clients from the $2^{nd}$ priority EGO Node3 till another timeout, then the $3^{rd}$ priority EGO Node4 starts sending P2P Invitation Request. In this manner, If there are k EGO nodes in the EGO list, then it takes k timeout duration before starting a fresh device discovery.

3.4) Fourth Example

Figure 19:
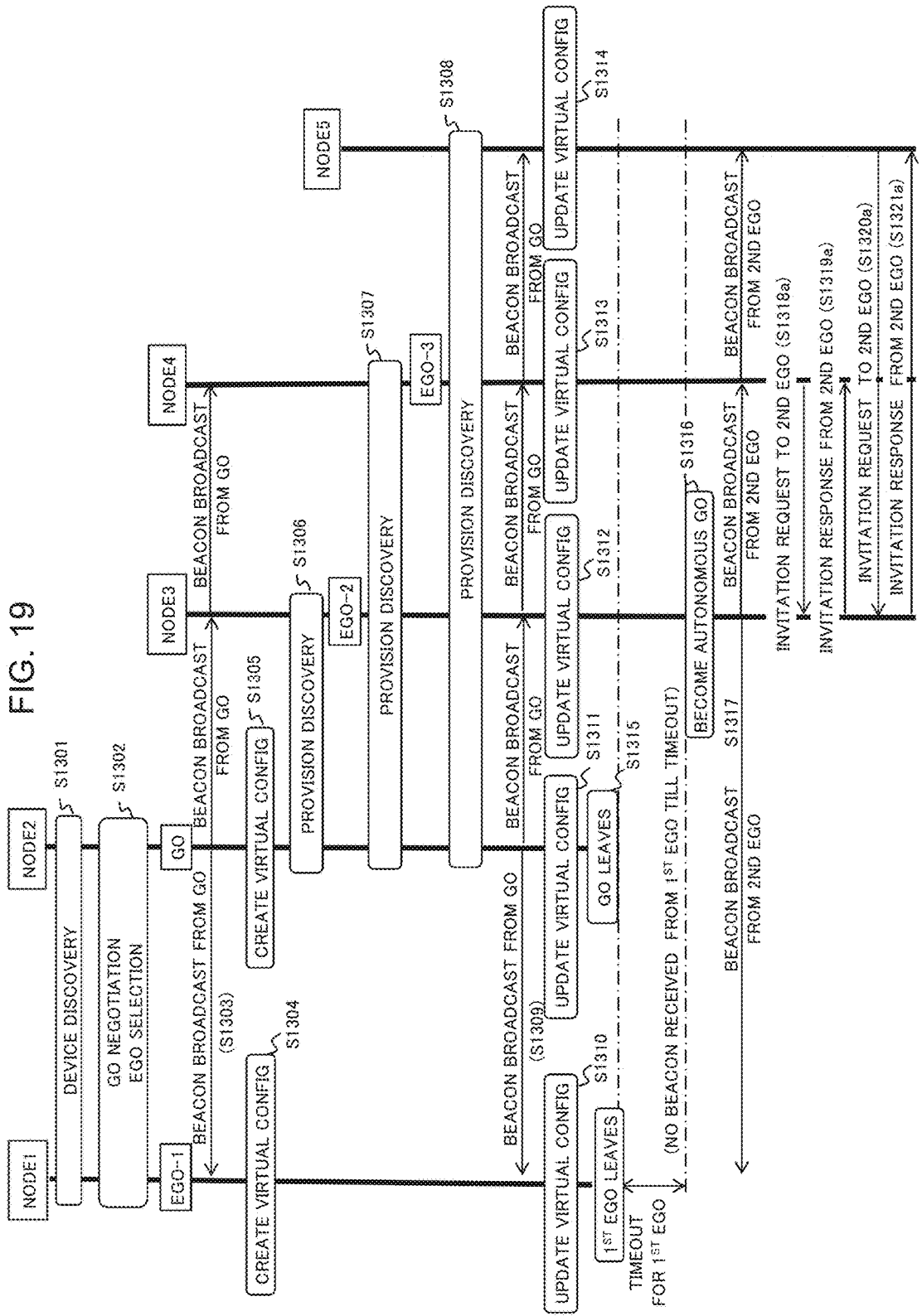
FIG. 19 is a timing sequence showing a fourth example of Wi-Fi Direct operation according to the exemplary embodiment.

Alternatively, invitation may be initiated by the clients by sending invitation request to $2^{nd}$ EGO as shown in FIG. 19.

With reference to FIG. 19, the scenario considered is same as explained in FIG. 18. Once no beacon is found from the $1^{st}$ EGO till timeout, the $2^{nd}$ EGO becomes Autonomous EGO and starts sending beacons. However, in this case the invitation is initiated by the clients by sending invitation request to $2^{nd}$ EGO (Operations S1318a, S1320a). The $2^{nd}$ EGO responds back using invitation response (Operations S1319a, S1321a) and persistent group is formed.

3.5) Fifth Example

Another example of group formation and group reformation will be described by references to FIGS. 20, 21 and 22. In this example, all EGO nodes included in the EGO list 203 assume Autonomous GO-ship simultaneously after the disappearance of GO.

Figure 20:
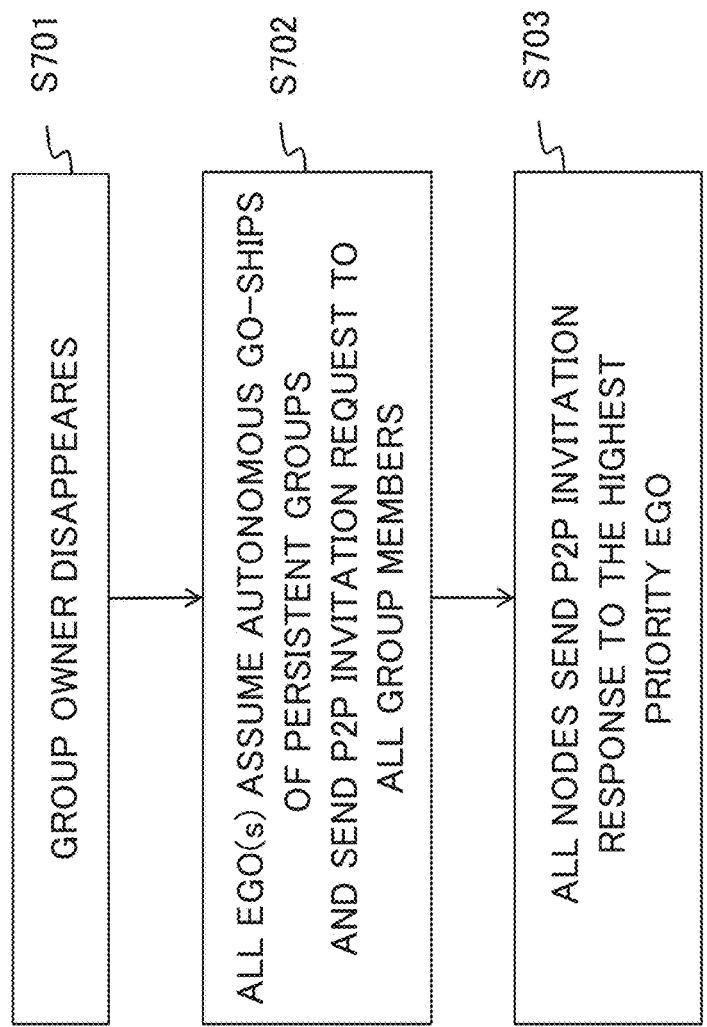
FIG. 20 is a flowchart showing a fifth example of Wi-Fi Direct operation when the GO node leaves according to the exemplary embodiment of the present invention.

Referring to FIG. 20, when it is detected that the GO node 101 disappears from the group (Operation S701), all EGO nodes simultaneously become Autonomous GO and send P2P Invitation Requests to all the members of the previous group and waits for P2P Invitation Response (Operation S702). On receiving the Invitation Request, all members respond to the highest priority EGO node (here, the 1st priority EGO node 106) with P2P Invitation Response (Operation S703). Thus, using the information of the virtual persistent group that was added in the configuration file as described before, a persistent P2P group is created.

More detailed system operation will be described by reference to FIG. 21, where operations S1401-S1415 are similar to the operations S1201-S1215 and therefore their details are omitted.

Figure 21:
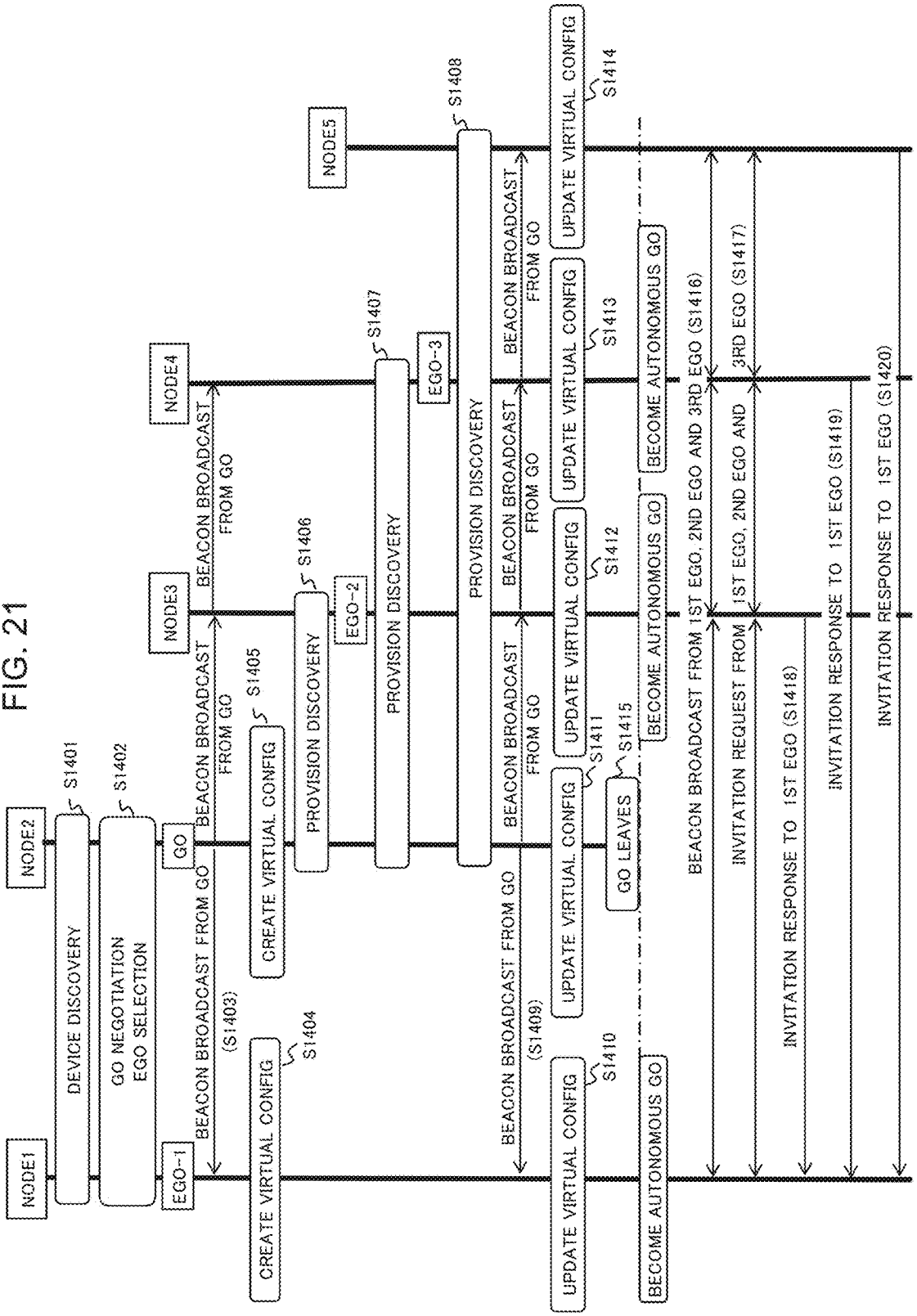
FIG. 21 is a timing sequence showing the fifth example of Wi-Fi Direct operation according to the exemplary embodiment of the present invention.

Referring to FIG. 21, once the GO Node2 leaves (Operation S1415), all EGO Node1, Node3 and Node4 becomes Autonomous GO and start sending beacons and invitation requests simultaneously to all other group members without waiting for any timeout for each EGO (Operations S1416 and S1417). Among all the received invitations, every node chooses the highest priority EGO Node (here, the 1st priority EGO Node1) and send invitation responses back to the 1st priority EGO Node1 (Operations S1418, S1419 and S1420). Since nodes do not need to wait till a timeout period, they can instantly connect to the 2nd priority EGO in that case.

3.6) Sixth Example

Figure 22:
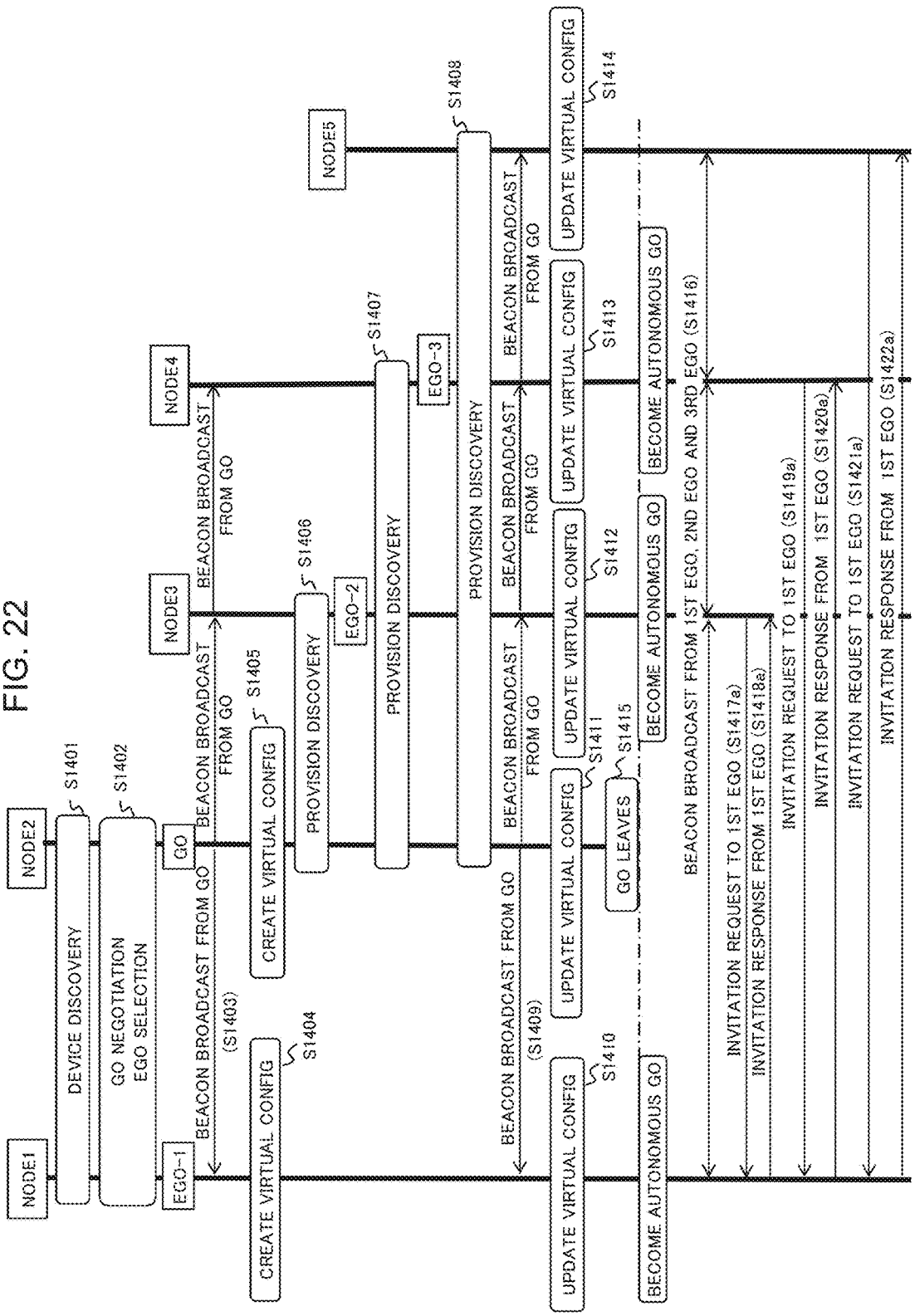
FIG. 22 is a timing sequence showing the sixth example of Wi-Fi Direct operation according to the exemplary embodiment.

Alternatively, invitation may be initiated by the clients by sending invitation request to 1st EGO as shown in FIG. 22.

Referring to FIG. 22, once the GO Node2 leaves (Operation S1415), all EGO Node1, Node3 and Node4 becomes Autonomous GO simultaneously and starts sending beacons without waiting for any timeout for each EGO (Operation S1416). Among all the received EGO beacons, every node chooses the highest priority EGO Node (here, the 1st priority EGO Node1) and send invitation request to the 1st priority EGO Node1 (Operations S1417a, S1419a and S1421a). The 1st priority EGO Node1 responds with a invitation response (Operations S1418a, S1420a and S1422a) and persistent group is formed.

3.7) Other Examples

In a specific scenario of the present embodiment, there may be a case where the 1st priority EGO node becomes Autonomous GO and sends beacons as soon as the original GO quits; but one or more clients may not receive the beacon due to reasons like packet drop caused by collisions in an interference-prone environment or because of moving out of the transmission range of the EGO node or shadowing caused by mobility of nodes. In that case, the client(s) wait for one timeout duration and then expects the beacon from the 2nd priority EGO node. But the 2nd priority EGO node may have already connected to the 1st priority EGO node as a client. So, the 2nd priority EGO node does not send any beacon. Now, two cases may happen from here. The first case is that none of the disconnected clients is an EGO from the list shared by the previous GO. Then, they will all wait till [k*(duration of 1 timeout)] time units before starting a fresh device discovery and form a group of their own assuming that the earlier group is lost. In the second case, one of the disconnected set of nodes is an EGO who featured in the list shared by the previous GO. But unable to receive the beacon from the 1st priority EGO due to some reason of packet drop, this next-lower priority EGO node may assume that all the higher priority EGO nodes may have left. So it will start sending beacon and the nodes who are still not connected to the higher priority EGO node will connect to the next-lower priority EGO node. Thus multiple subgroups may get formed in the rarest scenario. But even after forming subgroups, the nodes keep scanning the channel periodically to re-discover each other. Once a higher priority EGO node is detected, they inform their present group members and join it by P2P Invitation using the virtual persistent group configuration.

3.8) Effects

As specified in the specification of the Wi-Fi P2P standard, a persistent P2P group reuses the credentials of first session in later sessions and can be invoked by means of P2P Invitation. But it requires one of the nodes to be a persistent Group Owner of a past session. By remembering the members of the previous group, skipping GO negotiation and reusing the PSK of previous session, the initials steps of connection establishment comprising of Device Discovery, GO Negotiation and WPA Key generation and sharing of credentials (security key) between the internal registrar (GO) and the enrollee (client), the time taken for connection establishment is reduced drastically. In addition, if the frequency of operation for each virtual persistent group is also specified by the incumbent GO, then the time taken for device discovery by the client nodes to find the beacon of EGO will also be drastically reduced.

Figure 23:
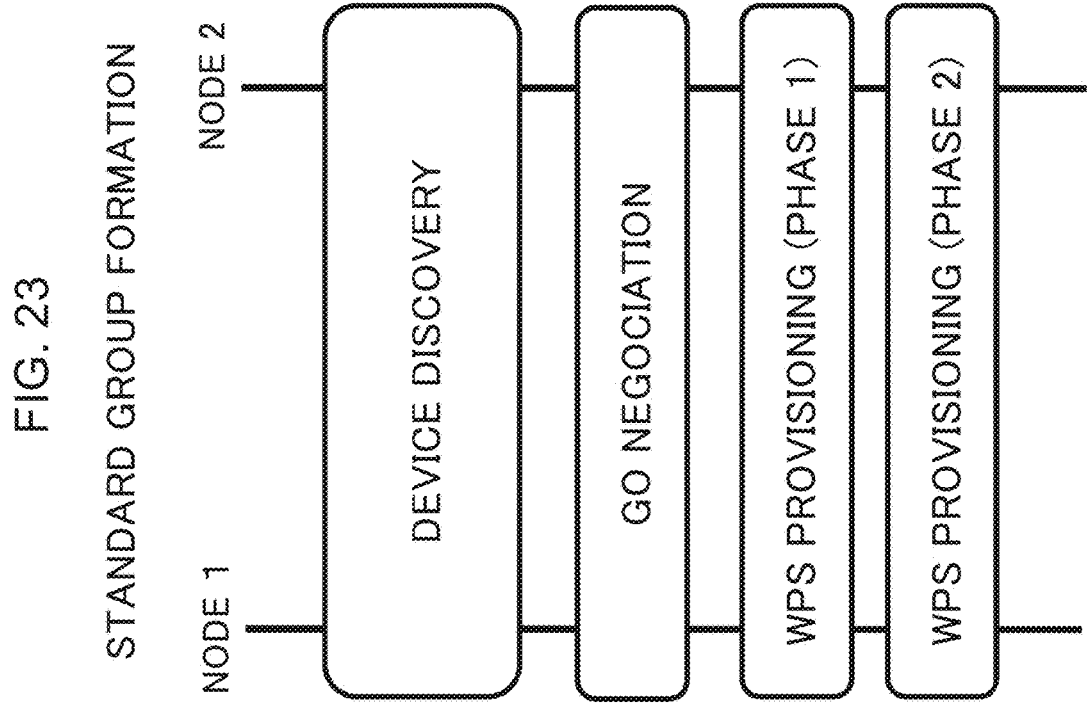
FIG. 23 is a schematic diagram showing an operation of Wi-Fi Direct standard group formation.
Figure 24:
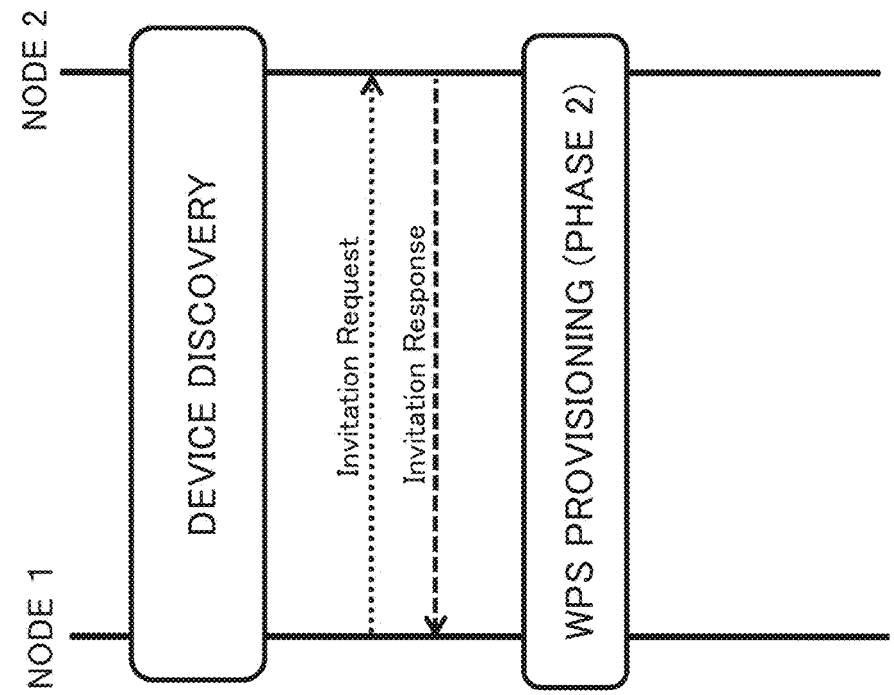
FIG. 24 is a schematic diagram showing an operation of Wi-Fi Direct persistent group formation.
Figure 25:
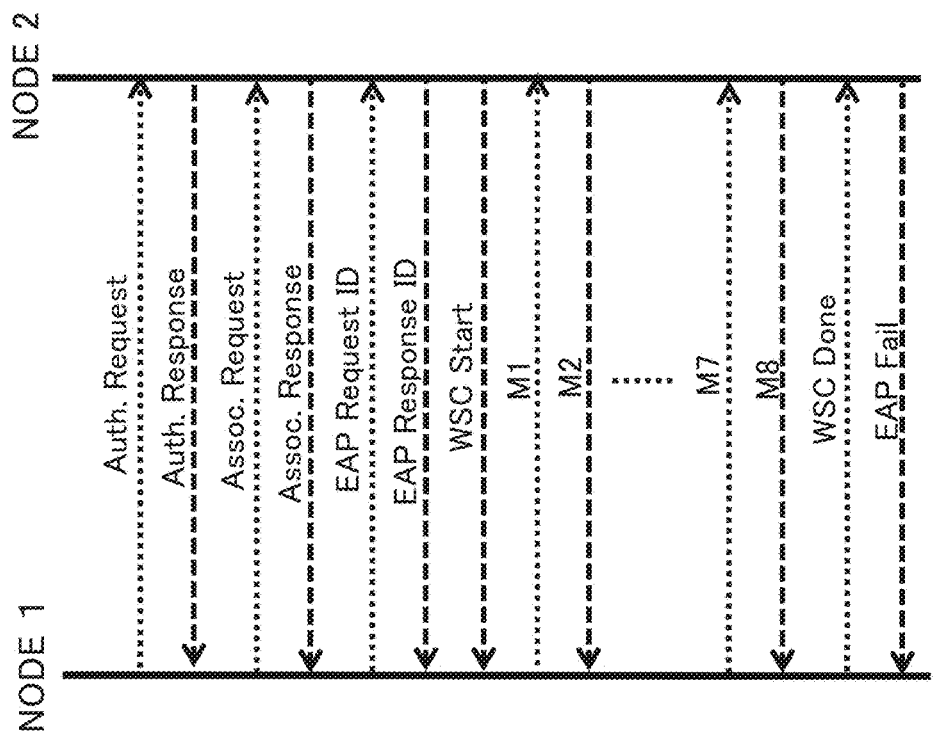
FIG. 25 is a schematic diagram showing an operation of Wi-Fi Direct WPS Provisioning (Phase 1).

In Wi-Fi Direct Standard, as shown in FIG. 23, the standard P2P group formation requires the following connection establishment steps: Device Discovery, GO Negotiation, WPS Provisioning (Phase 1) and WPS Provisioning (Phase 2). The WPS Provisioning (Phase 1) and WPS Provisioning (Phase 2) are shown in FIGS. 25 and 26. However, as shown in FIG. 24, the persistent group formation reuses the shared credentials to omit the WPS provisioning (phase 1), resulting in significantly reduced time required for WPS Provisioning phase. Accordingly, the time required for EGO-based group reformation after its GO leaves is drastically reduced by sharing credentials for virtual persistent group formation between the EGO node and other nodes which have no history of leader-client relationship.

4. Another Embodiment

The invention will also find application in another embodiment where the nodes from one Wi-Fi Direct group periodically switches to other Wi-Fi Direct groups in neighborhood for inter-group communication. In such cases, the switching node may discover neighboring Wi-Fi Direct group and prepare a virtual configuration of past association with the neighboring GO. The incumbent GO of the switching node includes the information of switching schedule in its beacon which is heard by the neighboring group. Thus the neighboring GO also prepares a virtual configuration for persistent group with the switching node. This enables quick inter-group switching by nodes.

5. Supplementary Notes (Supplementary Note 1)

A connection method in a wireless peer-to-peer group of nodes, wherein one of the nodes acts as a leader and others act as clients of the group, the method comprising:

sending credential information required for creating a virtual persistent group configuration from the leader to each of the clients;

creating a virtual persistent group configuration at each of the clients which has received the credential information from the leader; and when leadership of the leader disappears, establishing a first-time connection between a first client and a second client based on persistent mechanism by invitation using the virtual persistent group configuration even though the first client and second client never shared a GO-Client relationship in the past.

(Supplementary Note 2)

The connection method according to Supplementary Note 1, wherein the first client creates the virtual persistent group configuration by designating itself as a persistent leader and all other clients as a persistent client of the persistent leader; and the second client creates the virtual persistent group configuration by designating the first client as its persistent leader and using the credential information received from the leader.

(Supplementary Note 3)

The connection method according to Supplementary Note 1 or 2, wherein the first client as a persistent leader assumes Autonomous Group Owner role of persistent group session and sends an invitation request to the second client and the second client as a persistent client uses the virtual persistent group configuration to send an invitation response back to the first client.

(Supplementary Note 4)

The connection method according to Supplementary Note 1 or 2, wherein the first client as a persistent leader assumes Autonomous Group Owner role of persistent group session and sends beacon; the second client sends invitation request to the persistent leader and the persistent leader uses the virtual persistent group configuration to send an invitation response back to the second client.

(Supplementary Note 5)

The connection method according to any one of Supplementary Notes 1-4, wherein the leader further sends persistent leader information indicating at least one persistent leader candidate to each of the clients.

(Supplementary Note 6)

The connection method according to Supplementary Note 5, wherein the first client is one of a plurality of persistent leader candidates.

(Supplementary Note 7)

The connection method according to Supplementary Note 6, wherein the plurality of persistent leader candidates are prioritized to sequentially assume Autonomous Group Owner role of a virtual persistent group, wherein a persistent leader candidate assuming the Autonomous Group Owner role sends beacon or (beacon and invitation request) in order of priority as specified in the pre-shared priority list, wherein a client, when detecting the beacon, sends invitation request to the persistent leader candidate and, when receiving the invitation request from the persistent leader candidate, sends invitation response back to the persistent leader candidate.

(Supplementary Note 8)

The connection method according to Supplementary Note 6, wherein the persistent leader information includes priority information on the plurality of persistent leader candidates, wherein the plurality of persistent leader candidates concurrently assume Autonomous Group Owner role of persistent group and send the invitation request to the second client and the second client receiving the invitation request sends the invitation response to the first client which is selected according to the priority information.

(Supplementary Note 9)

The connection method according to Supplementary Note 6, wherein the persistent leader information includes priority information on the plurality of persistent leader candidates, wherein the plurality of persistent leader candidates concurrently assumes Autonomous Group Owner role of persistent group and sends beacon;

the second client receiving the beacon of first client sends invitation request to the first client which is selected according to the priority information; and the first client responding to the received invitation request by invitation response.

(Supplementary Note 10)

The connection method according to Supplementary Note 6, wherein only the highest priority emergency leader which is capable of assuming Autonomous Group Owner role after the disappearance of leader becomes the new persistent leader, all other lower priority emergency leaders and normal clients assume the role of persistent client to the highest priority emergency leader.

(Supplementary Note 11)

A system for forming a wireless peer-to-peer group of nodes, wherein one of the nodes acts as a leader and others act as clients of the group, wherein the leader sends credential information required for creating a virtual persistent group configuration to each of the clients;

each of the clients which has received the credential information from the leader creates a virtual persistent group configuration; and a first client and a second client establish a first-time connection between them based on persistent mechanism by invitation using the virtual persistent group configuration when leadership of the leader disappears even though the first client and second client never shared a GO-Client relationship in the past (Supplementary Note 12)

The system according to Supplementary Note 11, wherein the first client creates the virtual persistent group configuration by designating itself as a persistent leader and all other clients as a persistent client of the persistent leader; and the second client creates the virtual persistent group configuration by designating the first client as its persistent leader and using the credential information received from the leader.

(Supplementary Note 13)

The system according to Supplementary Note 11 or 12, wherein the first client as a persistent leader assumes Autonomous Group Owner role of persistent group session and sends an invitation request to the second client and the second client as a persistent client uses the virtual persistent group configuration to send an invitation response back to the first client.

(Supplementary Note 14)

The system according to Supplementary Note 11 or 12, wherein the first client as a persistent leader assumes Autonomous Group Owner role of persistent group session and sends beacon; the second client sends invitation request to the persistent leader and the persistent leader uses the virtual persistent group configuration to send an invitation response back to the second client.

(Supplementary Note 15)

The system according to any one of Supplementary Notes 11-14, wherein the leader further sends persistent leader information indicating at least one persistent leader candidate to each of the clients.

(Supplementary Note 16)

The system according to Supplementary Note 15, wherein the first client is one of a plurality of persistent leader candidates.

(Supplementary Note 17)

The system according to Supplementary Note 16, wherein the plurality of persistent leader candidates is prioritized to sequentially assume Autonomous Group Owner role of a virtual persistent group and send beacon and invitation request in order of priority.

(Supplementary Note 18)

The system according to Supplementary Note 16, wherein the persistent leader information includes priority information on the plurality of persistent leader candidates, wherein the plurality of persistent leader candidates concurrently assumes Autonomous Group Owner role of persistent group and send the invitation request to the second client and the second client receiving the invitation request sends the invitation response to the first client which is selected according to the priority information.

(Supplementary Note 19)

A connection method in a wireless peer-to-peer group of nodes, wherein one of the nodes acts as a leader and others act as clients of the group, wherein an incumbent leader provides each of the clients with an emergency leader list and credential information, wherein the emergency leader list includes a plurality of prioritized emergency leaders and the credential information includes credentials for creation of persistent group configurations with the emergency leaders, wherein the emergency leaders are clients of an incumbent group;

each of the clients creates a virtual persistent group configuration in presence of the incumbent leader based on the emergency leader list and the credential information, wherein the virtual persistent group configuration depends on whether the client is a persistent client or an emergency leader;

invitation is exchanged between the emergency leader and each of the persistent clients when the incumbent leader quits; and each of the persistent clients invokes a persistent group with the emergency leader as a new persistent leader using the virtual persistent group configuration.

(Supplementary Note 20)

The connection method according to Supplementary Note 19, wherein when the client is a persistent client, the virtual persistent group configuration is created by designating the emergency leader as its persistent leader and using the credentials shared by the incumbent leader;

when the client is an emergency leader, the virtual persistent group configuration is created by designating itself as the emergency leader and all other clients as a persistent client of the emergency leader.

(Supplementary Note 21)

The connection method according to Supplementary Note 19 or 20, wherein every client in the group creates a virtual persistent group configuration with a new network block configuring the emergency leader as its emergency leader while staying connected to its incumbent group.

(Supplementary Note 22)

The connection method according to any one of Supplementary Notes 19-21, wherein the emergency leader of the emergency leader list creates a virtual persistent group configuration with a new network block configuring itself as the persistent leader and all associated members of its incumbent group as its persistent client while staying connected to its incumbent group.

(Supplementary Note 23)

The connection method according to Supplementary Note 19 or 20, wherein each of the emergency leaders of the emergency leader list creates a virtual persistent group configuration with multiple new network blocks, wherein the emergency leader configures itself as the persistent leader and all associated members of its incumbent group as its persistent client in one of the network blocks, and similarly configures each of other emergency leaders as its persistent leader in a different one of the remaining network blocks, while staying connected to its incumbent group.

(Supplementary Note 24)

The connection method according to Supplementary Note 19, 20 or 23, wherein each of the client s of the group, on receiving the emergency leader list, creates a virtual persistent group configuration with multiple new network blocks, wherein the client configures each of the emergency leaders as its persistent leader in separate network blocks while staying connected to its incumbent group.

(Supplementary Note 25)

The connection method according to any one of Supplementary Notes 19-24, wherein each of the clients having no group leader waits until a timeout for beacon (or, beacon and P2P Invitation Request) received from an emergency leader contained in the emergency leader list shared earlier by its previous leader; and starts fresh scanning for new devices after waiting for the timeout period.

(Supplementary Note 26)

The connection method according to Supplementary Note 25, wherein immediately after the leader quits, each emergency leader of the emergency leader list keeps sending invitation request until a timeout to every member of its previous group at the same time.

(Supplementary Note 27)

The connection method according to Supplementary Note 26, wherein the client initiates the invitation process by sending invitation request to the emergency leader after receiving the beacon from emergency leader and invokes persistent group session whose virtual configurations have been prepared before.

(Supplementary Note 28)

The connection method according to any one of Supplementary Notes 19-27, wherein each of the client creates the virtual persistent group configuration every time there is a change in the emergency leader list sent by the incumbent leader.

(Supplementary Note 29)

The connection method according to any one of Supplementary Notes 19-28, wherein the emergency leader updates the virtual persistent group configuration every time there is a change in the credential information sent by the incumbent leader and continues operating in the incumbent group until the incumbent leader leaves.

(Supplementary Note 30)

The connection method according to Supplementary Note 29, wherein each of the nodes updates its configuration file after getting the credential information from the incumbent leader and continues operating in the incumbent group until the incumbent leader leaves.

(Supplementary Note 31)

The connection method any one of Supplementary Notes 19-30, wherein each of the nodes reconfigures to know the existence of a persistent group with the emergency leader as the persistent leader and the clients as persistent client(s) and invokes the persistent group by P2P Invitation mechanism when the incumbent leader leaves the group.

(Supplementary Note 32)

The connection method according to any one of Supplementary Notes 19-31, wherein a node of the group discovers a neighboring group and prepares a virtual configuration of past association as persistent client with a neighboring leader of the neighboring group;

the neighboring leader similarly prepares a virtual configuration of persistent group with a discovered node in the neighborhood; and finally, the discovered node from the group joins another neighboring group by invitation mechanism using the credentials of the virtual persistent group session and thus enabling quick inter-group switching.

(Supplementary Note 33)

A System for forming a wireless peer-to-peer group of nodes, wherein one of the nodes acts as a leader and others act as clients of the group, wherein an incumbent leader provides each of the clients with an emergency leader list and credential information, wherein the emergency leader list includes a plurality of prioritized emergency leaders and the credential information includes credentials for creation of persistent group configurations with the emergency leaders, wherein the emergency leaders are clients of an incumbent group;

each of the clients creates a virtual persistent group configuration in presence of the incumbent leader based on the emergency leader list and the credential information, wherein the virtual persistent group configuration depends on whether the client is a persistent client or an emergency leader;

invitation is exchanged between the emergency leader and each of the persistent clients when the incumbent leader quits; and each of the persistent clients invokes a persistent group with the emergency leader as a new persistent leader using the virtual persistent group configuration.

(Supplementary Note 34)

A node in a wireless peer-to-peer group, wherein another node acts as a leader of the group and all nodes other than the leader act as a client, comprising:

a communication means for receiving credential information required for creating a virtual persistent group configuration from the leader and storing it into a storage means; and a control means performing:

when receiving the credential information from the leader, creating a virtual persistent group configuration using the credential information; and when leadership of the leader disappears, establishing a first-time connection to another client based on persistent mechanism by invitation using the virtual persistent group configuration.

(Supplementary Note 35)

The node according to Supplementary Note 34, wherein the control means controls such that when the node is a persistent leader and the other clients are persistent clients, the node creates the virtual persistent group configuration by designating itself as a persistent leader and all other clients as a persistent client of the persistent leader; and when the node is a persistent client and another client is a persistent leader, the node creates the virtual persistent group configuration by designating said another client as its persistent leader and using the credential information received from the leader.

(Supplementary Note 36)

The node according to Supplementary Note 34 or 35, wherein t the control means controls such that when the node is a persistent leader and the other clients are persistent clients, the node sends an invitation request to each of the other persistent clients; and when the node is a persistent client and another client is a persistent leader, the node uses the virtual persistent group configuration to send an invitation response back to the persistent leader.

(Supplementary Note 37)

A method in which an incumbent leader shares credential information including at least SSID, BSSID, pre-shared key and channel of operation corresponding to every emergency leader for creating virtual persistent group configuration.

(Supplementary Note 38)

A method according to Supplementary Note 37, in which client nodes switch to the channel of operation of $1^{st}$ priority emergency leader as specified by leader node in the shared information and listens to its beacon instead of scanning multiple channels for device discovery after the disappearance of leader node.

INDUSTRIAL APPLICABILITY

This invention can be applied to wireless peer-to-peer (P2P) networks.

REFERENCE SIGNS LIST

101-106 Node
201 Radio system
202 User controller
203 EGO list
204 Processor
205 Memory
401-403 Virtual persistent group configuration
401a, 401b, 402a, 402b Network block

The invention claimed is:

1. A connection method in a wireless peer-to-peer group of nodes, wherein one of the nodes acts as a leader and others act as clients of the group, the method comprising:

sending credential information required for creating a virtual persistent group configuration from the leader to each of the clients;

creating a virtual persistent group configuration at each of the clients which has received the credential information from the leader; and when leadership of the leader disappears, establishing a first-time connection between a first client and a second client based on a persistent mechanism by an invitation using the virtual persistent group configuration even though the first client and the second client never shared a leader-client relationship in a past period, wherein the first client creates the virtual persistent group configuration by designating itself as a persistent leader and all other clients as a persistent client of the persistent leader; and the second client creates the virtual persistent group configuration by designating the first client as its persistent leader using the credential information received from the leader.

2. The connection method according to claim 1, wherein the first client as a persistent leader assumes Autonomous Group Owner role of a persistent group session and sends an invitation request to the second client and the second client as a persistent client uses the virtual persistent group configuration to send an invitation response back to the first client.

3. The connection method according to claim 1, wherein the first client as a persistent leader assumes Autonomous Group Owner role of a persistent group session and sends a beacon; the second client sends an invitation request to the persistent leader and the persistent leader uses the virtual persistent group configuration to send an invitation response back to the second client.

4. A connection method in a wireless peer-to-peer group of nodes, wherein one of the nodes acts as a leader and others act as clients of the group, the method comprising:

sending credential information required for creating a virtual persistent group configuration from the leader to each of the clients;

creating a virtual persistent group configuration at each of the clients which has received the credential information from the leader; and when leadership of the leader disappears, establishing a first-time connection between a first client and a second client based on a persistent mechanism by an invitation using the virtual persistent group configuration even though the first client and the second client never shared a leader-client relationship in a past period, wherein the leader further sends persistent leader information indicating at least one persistent leader candidate to each of the clients.

5. The connection method according to claim 4, wherein the first client is one of a plurality of persistent leader candidates.

6. The connection method according to claim 5, wherein the plurality of persistent leader candidates are prioritized to sequentially assume Autonomous Group Owner role of a virtual persistent group, wherein a persistent leader candidate assuming the Autonomous Group Owner role sends a beacon or (a beacon and an invitation request) in order of priority as specified in a pre-shared priority list, wherein a client, when detecting the beacon, sends an invitation request to the persistent leader candidate and, when receiving the invitation request from the persistent leader candidate, sends an invitation response back to the persistent leader candidate.

7. The connection method according to claim 5, wherein the persistent leader information includes priority information on the plurality of persistent leader candidates, wherein the plurality of persistent leader candidates concurrently assume Autonomous Group Owner role of persistent group and send the invitation request to the second client; and the second client receiving the invitation request sends the invitation response to the first client which is selected according to the priority information.

8. The connection method according to claim 5, wherein the persistent leader information includes priority information on the plurality of persistent leader candidates, wherein the plurality of persistent leader candidates concurrently assume Autonomous Group Owner role of a persistent group and sends a beacon;

the second client receiving the beacon of the first client sends invitation request to the first client which is selected according to the priority information; and the first client responding to the received invitation request by invitation response.

9. The connection method according to claim 5, wherein only a highest priority emergency leader which is capable of assuming Autonomous Group Owner role after the disappearance of the leader becomes the new persistent leader, all other lower priority emergency leaders and normal clients assume the role of a persistent client to the highest priority emergency leader.

10. A system for forming a wireless peer-to-peer group of nodes, wherein one of the nodes acts as a leader and others act as clients of the group, wherein the leader sends credential information required for creating a virtual persistent group configuration to each of the clients;

each of the clients which has received the credential information from the leader creates a virtual persistent group configuration; and a first client and a second client establish a first-time connection between them based on a persistent mechanism by an invitation using the virtual persistent group configuration when leadership of the leader disappears even though the first client and the second client never shared a leader-client relationship in a past period, wherein the first client creates the virtual persistent group configuration by designating itself as a persistent leader and all other clients as a persistent client of the persistent leader; and the second client creates the virtual persistent group configuration by designating the first client as its persistent leader using the credential information received from the leader.

11. A node in a wireless peer-to-peer group, wherein another node acts as a leader of the group and all nodes other than the leader act as a client, comprising:

a radio transceiver configured to receive credential information required for creating a virtual persistent group configuration from the leader and store the credential information into a memory; and a controller configured to perform:

when receiving the credential information from the leader, creating a virtual persistent group configuration using the credential information; and when leadership of the leader disappears, establishing a first-time connection to another client based on a persistent mechanism by an invitation using the virtual persistent group configuration even though the node and the another client never shared a leader-client relationship in a past period, wherein the controller controls such that when the node is a persistent leader and the other clients are persistent clients, the node creates the virtual persistent group configuration by designating itself as a persistent leader and all other clients as a persistent client of the persistent leader; and when the node is a persistent client and another client is a persistent leader, the node creates the virtual persistent group configuration by designating said another client as its persistent leader using the credential information received from the leader.

12. The node according to claim 11, wherein the controller controls such that, when leadership of the leader disappears,
if the node is a persistent leader and the other clients are persistent clients, the node sends an invitation request to each of the other persistent clients; and
if the node is a persistent client and another client is a persistent leader, the node uses the virtual persistent group configuration to send an invitation response back to the persistent leader.

13. The node according to claim 11, wherein the controller controls such that, when leadership of the leader disappears,
if the node is a persistent leader and the other clients are persistent clients, the persistent leader assumes Autonomous Group Owner role of a persistent group session and sends a beacon;
when an invitation request is received from the persistent client, the persistent leader uses the virtual persistent group configuration to send an invitation response back to the persistent client.

14. The node according to claim 11, wherein the radio transceiver further receives persistent leader information indicating at least one persistent leader candidate from the leader.

15. The node according to claim 14, wherein a plurality of persistent leader candidates are prioritized with respect to establishment of the first-time connection to the another client.

16. A connection method of a node in a wireless peer-to-peer group of nodes, wherein one of the nodes acts as a leader and others act as clients of the group, wherein
a communication section of the node receives an emergency leader list and credential information from an incumbent leader, wherein the emergency leader list includes a plurality of prioritized emergency leaders and the credential information includes credentials for creation of persistent group configurations with the emergency leaders, wherein the emergency leaders are clients of an incumbent group; and
a controller of the node controls such that
a virtual persistent group configuration is created in presence of the incumbent leader based on the emergency leader list and the credential information received from the incumbent leader, wherein the virtual persistent group configuration depends on whether the node is a persistent client or an emergency leader;
when the incumbent leader quits, the node as the emergency leader or the persistent client invokes a persistent group with the emergency leader as a new persistent leader using the virtual persistent group configuration, wherein the controller controls such that
when the node is a persistent leader and the other clients are persistent clients, the node creates the virtual persistent group configuration by designating itself as a persistent leader and all other clients as a persistent client of the persistent leader; and
when the node is a persistent client and another client is a persistent leader, the node creates the virtual persistent group configuration by designating said another client as its persistent leader using the credential information received from the leader.

17. A non-transitory, recording medium storing a program that makes a computer function as a node in a wireless peer-to-peer group, wherein another node acts as a leader of the group and all nodes other than the leader act as a client, the program comprising instructions to:
receive credential information required for creating a virtual persistent group configuration from the leader and store it into a memory;
when receiving the credential information from the leader, create a virtual persistent group configuration using the credential information; and
when leadership of the leader disappears, establish a first-time connection to another client based on a persistent mechanism by an invitation using the virtual persistent group configuration even though the node and the another client never shared a leader-client relationship in a past period, wherein
when the node is a persistent leader and the other clients are persistent clients, the node creates the virtual persistent group configuration by designating itself as a persistent leader and all other clients as a persistent client of the persistent leader; and
when the node is a persistent client and another client is a persistent leader, the node creates the virtual persistent group configuration by designating said another client as its persistent leader using the credential information received from the leader.

18. The node according to claim 11, wherein the wireless peer-to-peer group is a WiFi P2P or WiFi Direct group.

19. The connection method according to claim 2, wherein each of the clients creates the virtual persistent group configuration including an artificial history of a persistent group session between the first client and the second client.

20. The connection method according to claim 4, wherein each of the clients creates the virtual persistent group configuration including an artificial history of a persistent group session between the first client and the second client.

21. The node according to claim 11, wherein the controller creates the virtual persistent group configuration including an artificial history of a persistent group session with the new persistent leader.

22. The non-transitory, recording medium according to claim 17, wherein the node creates the virtual persistent group configuration including an artificial history of a persistent group session with the another client.

23. The connection method according to claim 2, wherein the credential information is at least one of an identity and type information corresponding to each nodes in the group including the first client and the second client, a pre-shared key, a service set identifier (SSID) corresponding to the first client, a basic service set identifier (BSSID) corresponding to the first client, and medium access control (MAC) addresses of all nodes in the group including the second client.

24. The connection method according to claim 4, wherein the credential information is at least one of an identity and type information corresponding to each nodes in the group including the first client and the second client, a pre-shared key, a service set identifier (SSID) corresponding to the first client, a basic service set identifier (BSSID) corresponding to the first client, and medium access control (MAC) addresses of all nodes in the group including the second client.

25. The node according to claim 11, wherein the credential information is at least one of an identity and type information corresponding to each nodes in the group including the first client and the second client, a pre-shared key, a service set identifier (SSID) corresponding to the first client, a basic service set identifier (BSSID) corresponding to the first client, and medium access control (MAC) addresses of all nodes in the group including the second client.

26. The non-transitory, recording medium according to claim 17, wherein the credential information is at least one of an identity and type information corresponding to each nodes in the group including the first client and the second client, a pre-shared key, a service set identifier (SSID) corresponding to the first client, a basic service set identifier (BSSID) corresponding to the first client, and medium access control (MAC) addresses of all nodes in the group including the second client.

\* \* \* \* \*